(12) United States Patent
Sato et al.

(10) Patent No.: US 12,424,015 B2
(45) Date of Patent: Sep. 23, 2025

(54) IMAGE PROCESSING APPARATUS AND METHOD FOR RECOGNIZING STATE OF SUBJECT

(71) Applicant: CANON KABUSHIKI KAISHA, Tokyo (JP)

(72) Inventors: Shunsuke Sato, Kanagawa (JP); Koichi Takeuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1010 days.

(21) Appl. No.: 17/505,416

(22) Filed: Oct. 19, 2021

(65) Prior Publication Data

US 2022/0036056 A1 Feb. 3, 2022

Related U.S. Application Data

(63) Continuation of application No. PCT/JP2020/012840, filed on Mar. 24, 2020.

(30) Foreign Application Priority Data

Apr. 22, 2019 (JP) .................. 2019-080893

(51) Int. Cl.
*G06K 9/00* (2022.01)
*G06F 18/2415* (2023.01)
(Continued)

(52) U.S. Cl.
CPC .......... *G06V 40/10* (2022.01); *G06F 18/2415* (2023.01); *G06F 18/2431* (2023.01);
(Continued)

(58) Field of Classification Search
CPC .... G06K 9/00362; G06K 9/03; G06K 9/4671; G06K 9/628; G06K 9/6277
(Continued)

(56) References Cited

U.S. PATENT DOCUMENTS

| 6,879,709 B2 * | 4/2005 | Tian ..................... G06V 40/175 |
| | | 382/199 |
| 8,401,243 B2 | 3/2013 | Komoto |

(Continued)

FOREIGN PATENT DOCUMENTS

| CN | 103155003 B | 9/2016 |
| CN | 109377513 A | 2/2019 |

(Continued)

OTHER PUBLICATIONS

Zhe Cao, et al., Realtime Multi-Person 2D Pose Estimation Using Part Affinity Fields, CVPR, 2017, 9 pages.

(Continued)

*Primary Examiner* — Marceau Milord
(74) *Attorney, Agent, or Firm* — Canon U.S.A., Inc. IP Division

(57) ABSTRACT

An image processing apparatus includes detecting means for detecting a plurality of predetermined parts of a subject from an image, estimating means for estimating a cause of failed detection if any of the plurality of predetermined parts is not detected in a result of the detection made by the detecting means, and determining means for determining a state of the subject based on a part detected by the detecting means and the cause estimated by the estimating means.

19 Claims, 15 Drawing Sheets

(51) Int. Cl.
*G06F 18/2431* (2023.01)
*G06N 7/01* (2023.01)
*G06T 7/246* (2017.01)
*G06T 7/70* (2017.01)
*G06V 10/46* (2022.01)
*G06V 10/98* (2022.01)
*G06V 40/10* (2022.01)

(52) U.S. Cl.
CPC ............... *G06N 7/01* (2023.01); *G06T 7/248* (2017.01); *G06T 7/70* (2017.01); *G06V 10/462* (2022.01); *G06V 10/98* (2022.01)

(58) Field of Classification Search
USPC .................................................. 382/181, 157
See application file for complete search history.

(56) References Cited

U.S. PATENT DOCUMENTS

| | | | | |
|---|---|---|---|---|
| 8,929,612 B2* | 1/2015 | Ambrus | ............... | G06V 40/107 382/115 |
| 9,520,072 B2* | 12/2016 | Sun | ............... | G09B 23/30 |
| 9,652,043 B2* | 5/2017 | Kang | ............... | G06F 3/017 |
| 9,747,306 B2* | 8/2017 | Itani | ............... | G06F 3/011 |
| 2003/0133599 A1* | 7/2003 | Tian | ............... | G06V 40/175 382/118 |
| 2005/0157908 A1* | 7/2005 | Matsugu | ............... | G06V 20/00 382/107 |
| 2008/0144925 A1* | 6/2008 | Zhu | ............... | G06V 10/24 382/154 |
| 2010/0197390 A1* | 8/2010 | Craig | ............... | G06T 19/00 463/30 |
| 2011/0317871 A1* | 12/2011 | Tossell | ............... | G06V 40/23 382/103 |
| 2012/0155707 A1* | 6/2012 | Kawano | ............... | G06V 40/23 382/103 |
| 2013/0069940 A1* | 3/2013 | Sun | ............... | G06T 19/006 345/419 |
| 2013/0230211 A1 | 9/2013 | Tanabiki | | |
| 2013/0300659 A1* | 11/2013 | Kang | ............... | G06F 3/017 345/158 |
| 2014/0119599 A1* | 5/2014 | Dal Mutto | ............... | G06F 3/011 382/103 |
| 2016/0110606 A1* | 4/2016 | Lee | ............... | G06V 20/588 382/104 |
| 2019/0266392 A1* | 8/2019 | Watanabe | ............... | G06V 40/103 |

FOREIGN PATENT DOCUMENTS

| | | |
|---|---|---|
| JP | 2009296355 A | 12/2009 |
| JP | 2011039994 A | 2/2011 |
| JP | 2012155391 A | 8/2012 |
| JP | 5233977 B2 | 7/2013 |
| JP | 5881136 B2 | 3/2016 |
| JP | 2017199303 A | 11/2017 |
| KR | 101556696 B1 | 10/2015 |

OTHER PUBLICATIONS

Ying Zhang, et al., Video Anomaly Detection Based on Locality Sensitive Hashing Filters, Pattern Recognition, 2016, 59, pp. 302-311.

Shaoqing Ren, et al., Faster R-CNN: Towards Real-Time Object Detection with Region Proposal Networks, Advances in Neural Information Processing Systems, 2015, 9 pages.

* cited by examiner

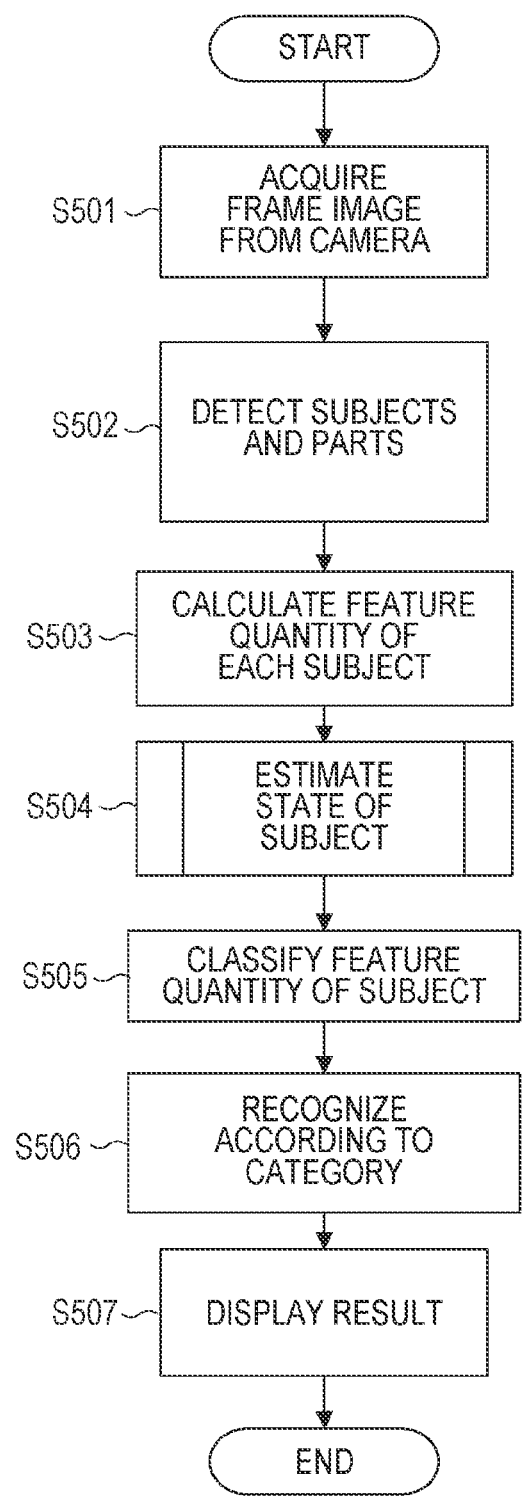

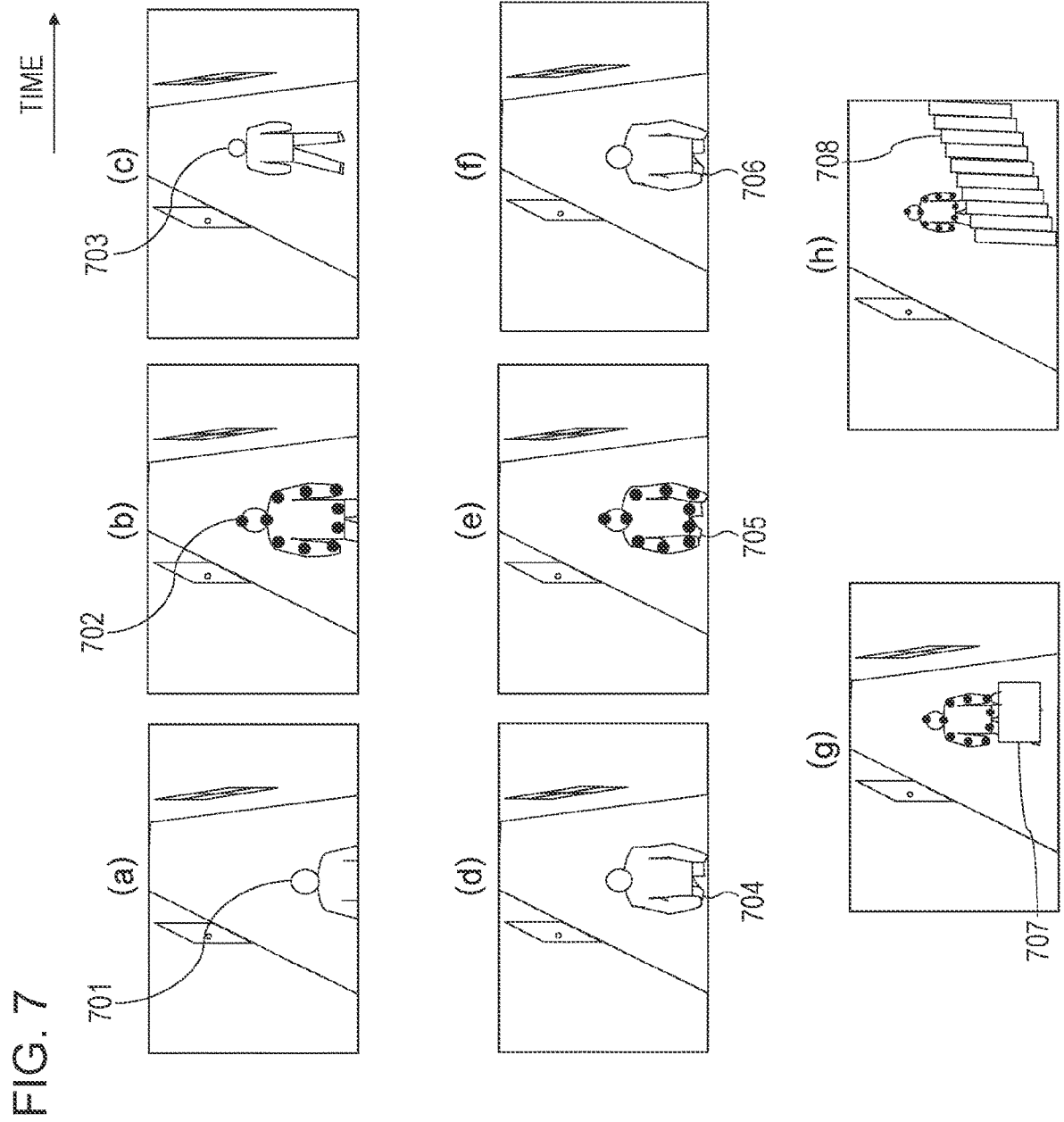

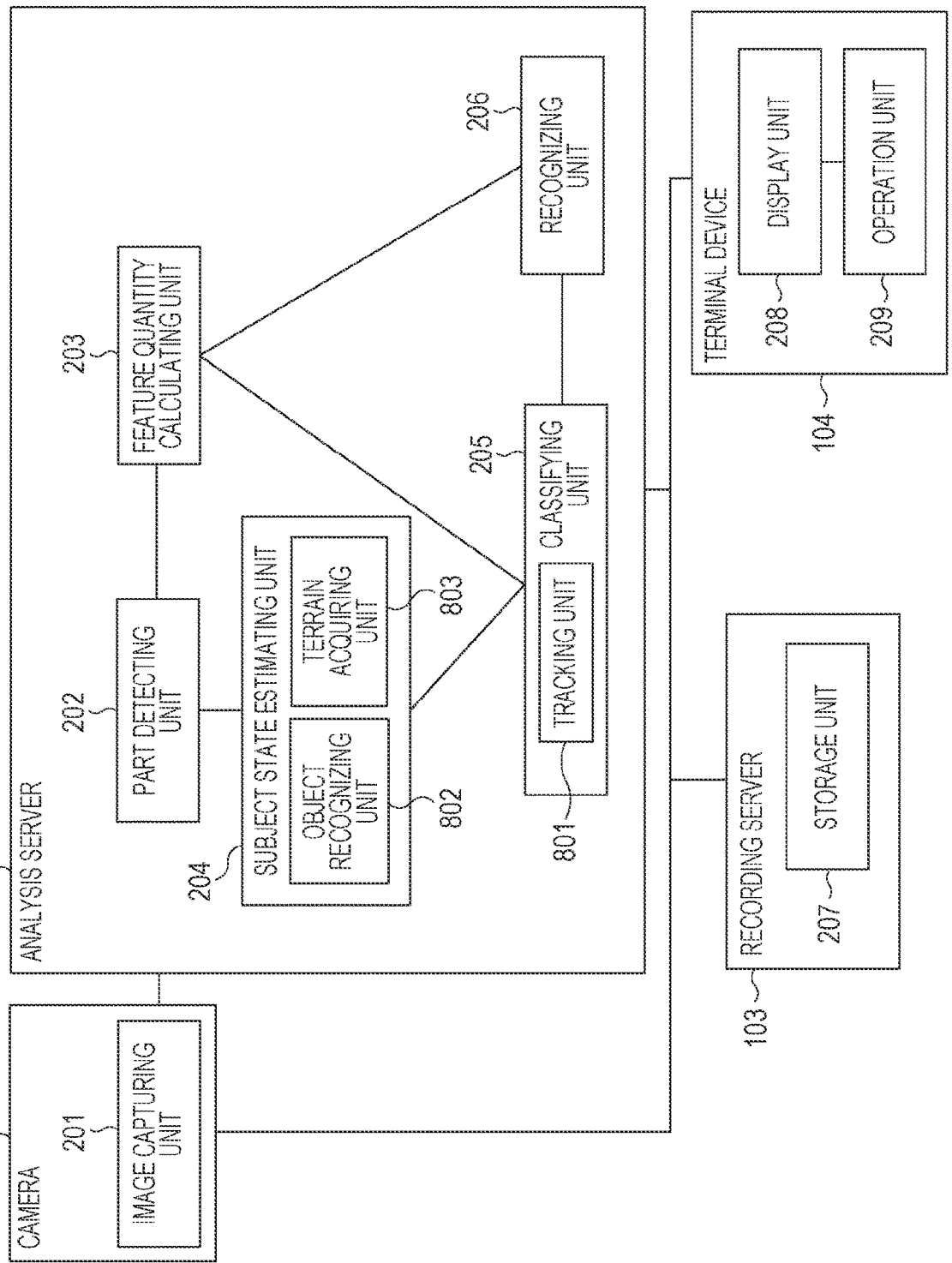

IMAGE PROCESSING APPARATUS AND METHOD FOR RECOGNIZING STATE OF SUBJECT

CROSS-REFERENCE TO RELATED APPLICATIONS

This application is a Continuation of International Patent Application No. PCT/JP2020/012840, filed Mar. 24, 2020, which claims the benefit of Japanese Patent Application No. 2019-080893, filed Apr. 22, 2019, both of which are hereby incorporated by reference herein in their entirety.

TECHNICAL FIELD

The present disclosure particularly relates to an image processing apparatus and an image processing method that recognize a state of a subject.

BACKGROUND ART

As a video processing technique, a method has been proposed which detects parts of a subject to recognize the state of the subject. Patent Literature 1 discloses a device that recognizes parts of a human body and provides notification of whether, for example, the pose of a golf swing is correct.

CITATION LIST

Patent Literature

PTL 1 Japanese Patent No. 5881136

Non Patent Literature

NPL 1 Cao, Zhe, et al. "Realtime Multi-Person 2D Pose Estimation using Part Affinity Fields CVPR." (2017).
NPL 2 ZHANG, Ying, et al. Video anomaly detection based on locality sensitive hashing filters. Pattern Recognition, 2016, 59: 302-311.
NPL 3 Ren, Shaoqing, et al. "Faster r-cnn: Towards real-time object detection with region proposal networks." Advances in neural information processing systems. 2015.

In a method of detecting parts of a subject, some parts may not be detected and may be missing in the result, because they are cut off the image or shielded by other objects. For example, parts at the feet and lower legs of a person cannot be detected, both in the case where the person sits on the ground and the feet and lower legs are shielded by the person's body (self-shielded), and in the case where the feet and lower legs extend beyond the screen and are cut off. This means that positional information of human body parts obtained when the person is self-shielded may be similar to that obtained when the person is cut off the screen. It is difficult to distinguish one state from the other.

In view of the issue described above, the present disclosure aims to accurately identify the state of a subject when some parts of the subject are not detected.

SUMMARY

According to an aspect of the present disclosure, an image processing apparatus includes detecting means for detecting a plurality of predetermined parts of a subject from an image, estimating means for estimating a cause of failed detection if any of the plurality of predetermined parts is not detected in a result of the detection made by the detecting means, and determining means for determining a state of the subject based on a part detected by the detecting means and the cause estimated by the estimating means.

Further features of the present disclosure will become apparent from the following description of exemplary embodiments with reference to the attached drawings.

BRIEF DESCRIPTION OF DRAWINGS

FIG. 5 is a flowchart illustrating an exemplary processing procedure an analysis server performs each time it receives a video frame image.

FIG. 7 is a diagram for explaining details of a state of a subject displayed in the display unit.

FIG. 8 is a block diagram illustrating an exemplary functional configuration of an information processing system according to a second embodiment.

DESCRIPTION OF EMBODIMENTS

First Embodiment

Figure 1:
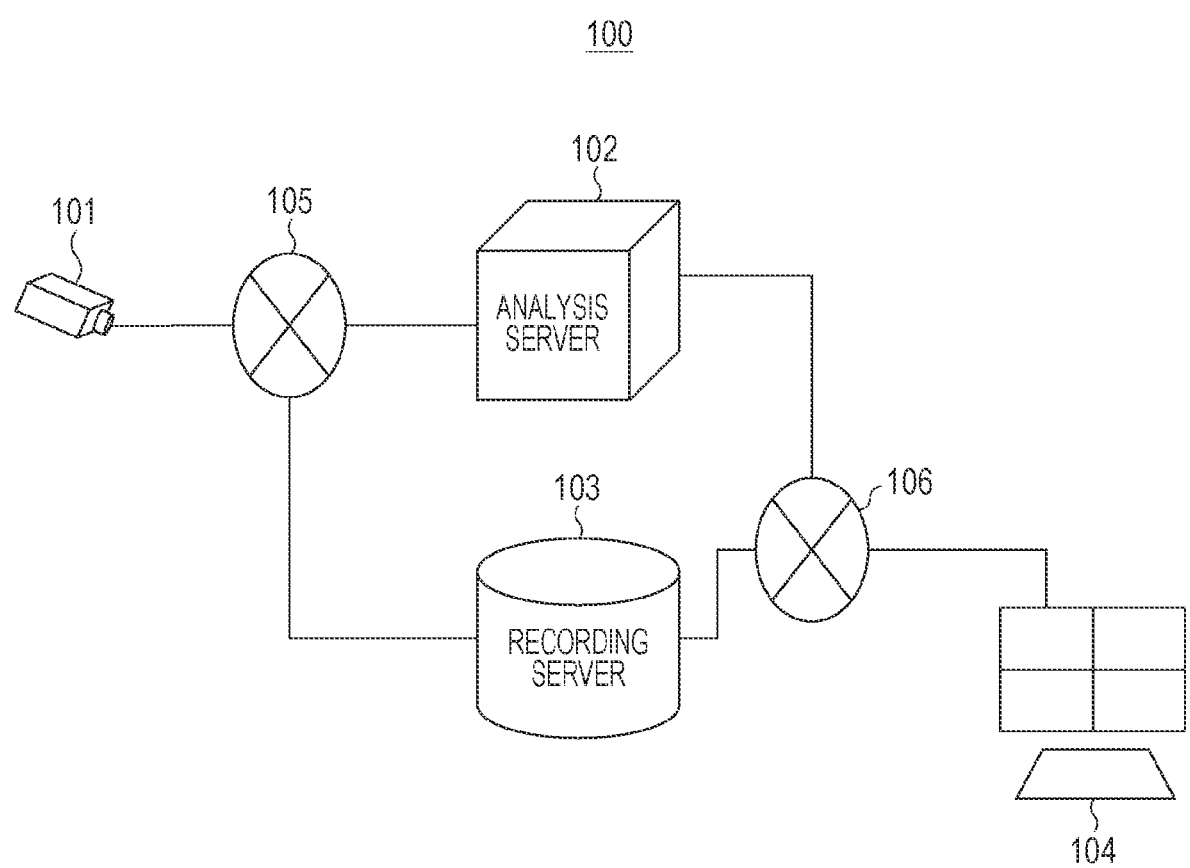
FIG. 1 is a diagram illustrating an exemplary overall configuration of an information processing system according to an embodiment.

A first embodiment of the present disclosure will now be described with reference to the drawings. FIG. 1 is a diagram illustrating an exemplary overall configuration of an information processing system 100 according to the present embodiment. As illustrated in FIG. 1, the information processing system 100 according to the present embodiment includes a camera 101, an analysis server 102, a recording server 103, and a terminal device 104. The camera 101, the analysis server 102, and the recording server 103 are connected by a camera network 105. The analysis server 102, the recording server 103, and the terminal device 104 are connected by a client network 106. The camera network 105 and the client network 106 are each constituted, for example, by a LAN.

The camera 101 is an image pickup apparatus that includes, for example, an image pickup element, a lens, a motor driving the image pickup element and the lens, and an MPU controlling these components. The camera 101 captures a moving image and converts the captured moving image to electronic data. The camera 101 is installed in a place where the user requires monitoring. The camera 101 transmits the captured moving image (video data) through the camera network 105.

The analysis server 102 is an information processing apparatus, such as a calculator. The analysis server 102 analyzes video data transmitted from the camera 101 or video data recorded in the recording server 103. The analysis involves recognition processing, such as face recognition, person tracking, measurement of the flow of people, intrusion detection, person attribute detection, weather detection, or traffic jam detection, depending on the location of installation. The analysis server 102 then summarizes the results of the analysis and notifies the user of the result in accordance with settings.

The present embodiment describes a method of recognizing a person who takes an abnormal behavior in an image. The abnormal behavior described here is a behavior that is significantly different from those normally observed in the place where the camera 101 is installed. In hallways, for example, the abnormal behavior may be a fall, sudden sitting down after feeling sick, or striking out at other people or objects. A behavior like walking in a standing position may be normally observed in hallways, but other behaviors significantly different from such a behavior are regarded as abnormal behaviors. The definition of abnormal behavior may vary depending on the location or situation where the camera 101 is installed. In skating rinks or icy sidewalks in winter, for example, a fall may not be regarded as an abnormal behavior.

The recording server 103 records, in its storage, video data acquired from the camera 101, and transmits the recorded video data in response to requests from the analysis server 102 and the terminal device 104. The recording server 103 records metadata representing the result of analysis made by the analysis server 102, along with the video data. The storage is constituted by a recording medium, such as a hard disk, and an MPU. The recording server 103 may use a storage on the network, such as an NAS, an SAN, or a cloud service, instead of the recording medium.

The terminal device 104 is a calculator including a display. The terminal device 104 acquires, through the recording server 103, video data acquired by the camera 101. The terminal device 104 also acquires past video data recorded in the recording server 103, acquires video data along with the result of analysis made by the analysis server 102, and receives notification.

Although the camera 101, the analysis server 102, the recording server 103, and the terminal device 104 are different devices in the information processing system 100 according to the present embodiment, the present disclosure is not limited to this configuration. For example, the analysis server 102 and the recording server 103 may be implemented as different applications or virtual servers in a single server apparatus. The analysis server 102 or the recording server 103 may have the function of the terminal device 104, or the camera 101 may have the function of the analysis server 102 or the recording server 103.

Figure 2:
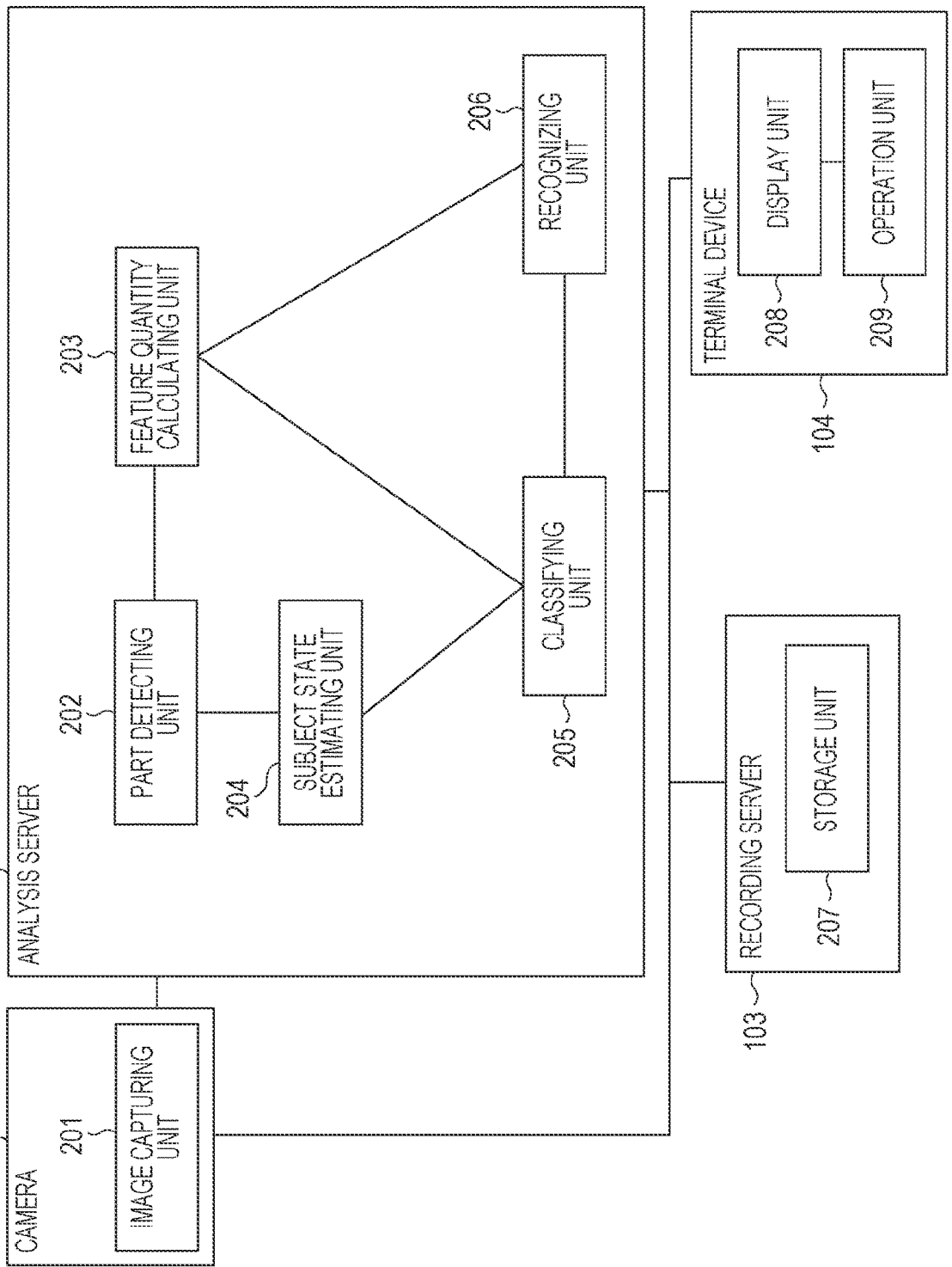
FIG. 2 is a block diagram illustrating an exemplary functional configuration of the information processing system according to the first embodiment.

FIG. 2 is a block diagram illustrating an exemplary functional configuration of the information processing system according to the present embodiment. As illustrated in FIG. 2, the information processing system 100 includes an image capturing unit 201, a part detecting unit 202, a feature quantity calculating unit 203, a subject state estimating unit 204, a classifying unit 205, a recognizing unit 206, a storage unit 207, a display unit 208, and an operation unit 209.

The image capturing unit 201 is configured to be included in the camera 101 illustrated in FIG. 1. The image capturing unit 201 captures an image, converts the captured image to electronic video data, and transmits the electronic video data to the analysis server 102 and the recording server 103.

The part detecting unit 202, the feature quantity calculating unit 203, the subject state estimating unit 204, the classifying unit 205, and the recognizing unit 206 are configured to be included in the analysis server 102 illustrated in FIG. 1.

The part detecting unit 202 is constituted, for example, by an MPU. From video data received from the image capturing unit 201, the part detecting unit 202 detects a subject falling under a predetermined category and predetermined parts constituting the subject. In the present embodiment, for a subject falling under a category of persons, the part detecting unit 202 detects positional information of joint points in the image.

The feature quantity calculating unit 203 is constituted, for example, by an MPU. The feature quantity calculating unit 203 extracts the feature quantity of the subject using the parts detected by the part detecting unit 202. In the present embodiment, the feature quantity calculating unit 203 calculates the feature quantity of the subject (person) using the positional information of joint points.

The subject state estimating unit 204 is constituted, for example, by an MPU. For the subject detected by the part detecting unit 202, the subject state estimating unit 204 estimates the state in the image. In this processing, undetected parts of the subject and the cause of failed detection are estimated as the state of the subject. Details of the state estimated in the present embodiment will be described later on below. The state of the subject is not limited to the cause described above. That is, anything that can be categorized as the state of the subject can be regarded as the "state" here. Examples of the state include the brightness and image quality of the subject. If the subject is a person, then attributes (e.g., sex and age) and clothes, feelings, and health conditions, each may also be regarded as the state of the subject.

The classifying unit 205 is constituted, for example, by an MPU. The classifying unit 205 classifies the feature quantity corresponding to the subject, in accordance with the state of the subject estimated by the subject state estimating unit 204.

The recognizing unit 206 is constituted, for example, by an MPU. The recognizing unit 206 recognizes a specific characteristic of the subject by using the feature quantity calculated by the feature quantity calculating unit 203. In the present embodiment, the characteristic to be recognized is whether the subject (person) behaves abnormally.

The storage unit 207 is configured to be included in the recording server 103 illustrated in FIG. 1. The storage unit 207 is constituted by a recording medium, such as a hard disk, and an MPU. The storage unit 207 records, in the recording medium, video data captured by the image capturing unit 201. The storage unit 207 also records metadata representing the result of analysis made by the analysis server 102, along with the video data.

The display unit 208 and the operation unit 209 are configured to be included in the terminal device 104 illustrated in FIG. 1. The display unit 208 is constituted by a liquid crystal screen (display) and an MPU controlling the display. The display unit 208 presents information through the display to the user. Also, the display unit 208 generates a user interface (UI) screen that allows operation, and displays the generated UI screen on the display.

The operation unit 209 is constituted, for example, by switches and a touch panel. The operation unit 209 senses the user operation and inputs the corresponding information to the terminal device 104. The operation unit 209 may use another pointing device, such as a mouse or a trackball, instead of the touch panel.

Although the present embodiment describes an example of detecting an abnormal behavior from an image, the target to be detected is not limited to this. For example, a specific person, vehicle type, or text may be detected from an image, or an event or time zone may be recognized from an image. Information, such as audio or visual metadata accompanying the image, may be used in detection.

An operation of the information processing apparatus according to the present embodiment will now be described with reference to FIG. 4.

FIG. 4 schematically illustrates examples where an image captured by the image capturing unit 201 is displayed by the display unit 208. The camera 101 serving as the image capturing unit 201 is installed in such a way as to capture an area to be monitored. The display unit 208 displays a current image captured by the camera. The user looks at the image to check for any abnormality in the monitored area.

Figure 4A:
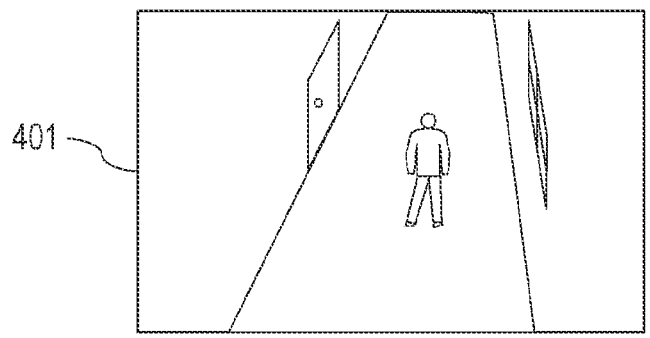
FIG. 4A is a schematic diagram illustrating an example where an image captured by an image capturing unit is displayed by a display unit.
Figure 4B:
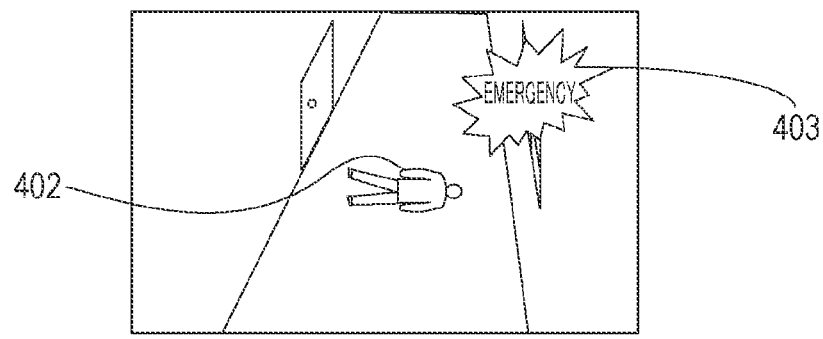
FIG. 4B is a schematic diagram illustrating another example where an image captured by the image capturing unit is displayed by the display unit.

When there is no particular abnormality as in the example illustrated in FIG. 4A, the captured image is simply displayed. If a person 402 who has fallen appears as in the example illustrated in FIG. 4B, the display unit 208 displays an alarm message 403 to call user's attention.

Figure 4C:
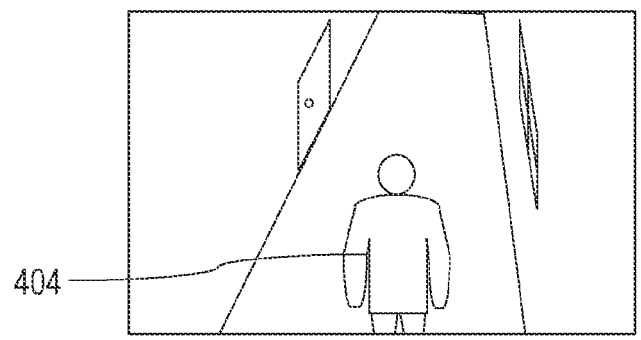
FIG. 4C is a schematic diagram illustrating another example where an image captured by the image capturing unit is displayed by the display unit.
Figure 4D:
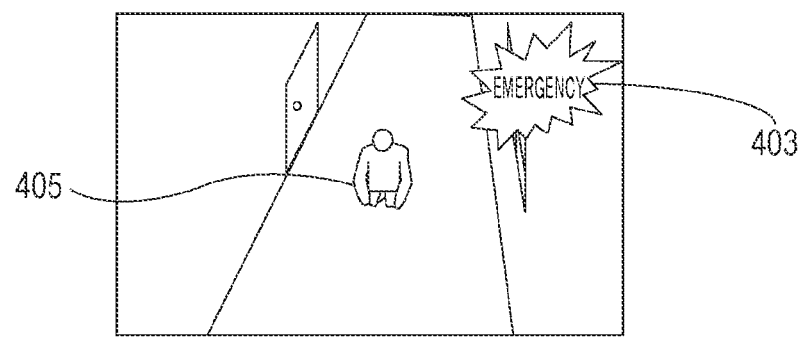
FIG. 4D is a schematic diagram illustrating another example where an image captured by the image capturing unit is displayed by the display unit.

FIG. 4C shows a person 404 who is cut off the screen, and FIG. 4D shows a person 405 sitting down in a hallway. That is, FIG. 4C shows a situation not requiring an alarm, whereas FIG. 4D shows a situation requiring an alarm. However, since the right and left knees and ankles of both the person 404 and the person 405 are missing, and the upper bodies of the person 404 and the person 405 are alike in pose, their difference in feature quantity based on the parts is small. Therefore, if an attempt is made to simply recognize a particular characteristic of the subject, the results of recognition in the examples of FIG. 4C and FIG. 4D are likely to be the same. This means that if no alarm is issued, the sitting down state of the person in FIG. 4D may be overlooked, whereas if an alarm is issued, the message appearing in FIG. 4C is a false alarm. In either case, the result is likely to be incorrect.

The present embodiment provides the classifying unit 205 to deal with such a situation. The person 404 and the person 405 are thus separately classified, so as to prevent false recognition in the recognizing unit 206 and improve accuracy in recognition.

FIG. 5 is a flowchart illustrating an exemplary processing procedure the analysis server 102 performs each time it receives a video frame image from the camera 101.

First, in step S501, the part detecting unit 202 acquires a received video frame image as image data.

Next, in step S502, from the image data received in step S501, the part detecting unit 202 detects persons (subjects) and positional information of their joint points. The positional information of joint points detected by the part detecting unit 202 according to the present embodiment will now be described with reference to FIG. 3.

The part detecting unit 202 detects the following 14 joint points from a person 300: a head top point 301, a neck point 302, a right shoulder point 303, a right elbow point 304, a right wrist point 305, a left shoulder point 306, a left elbow point 307, a left wrist point 308, a right hip joint point 309, a right knee point 310, a right ankle point 311, a left hip joint point 312, a left knee point 313, and a left ankle point 314. Although the head top point 301 is not exactly a joint of a human body, the points described above will be collectively referred to as joint points. Specific pairs of two joint points have a connection relation. Of the two joint points, one closer to the trunk of the body will be referred to as a parent joint point, and the other farther from the trunk of the body will be referred to as a child joint point.

Figure 3:
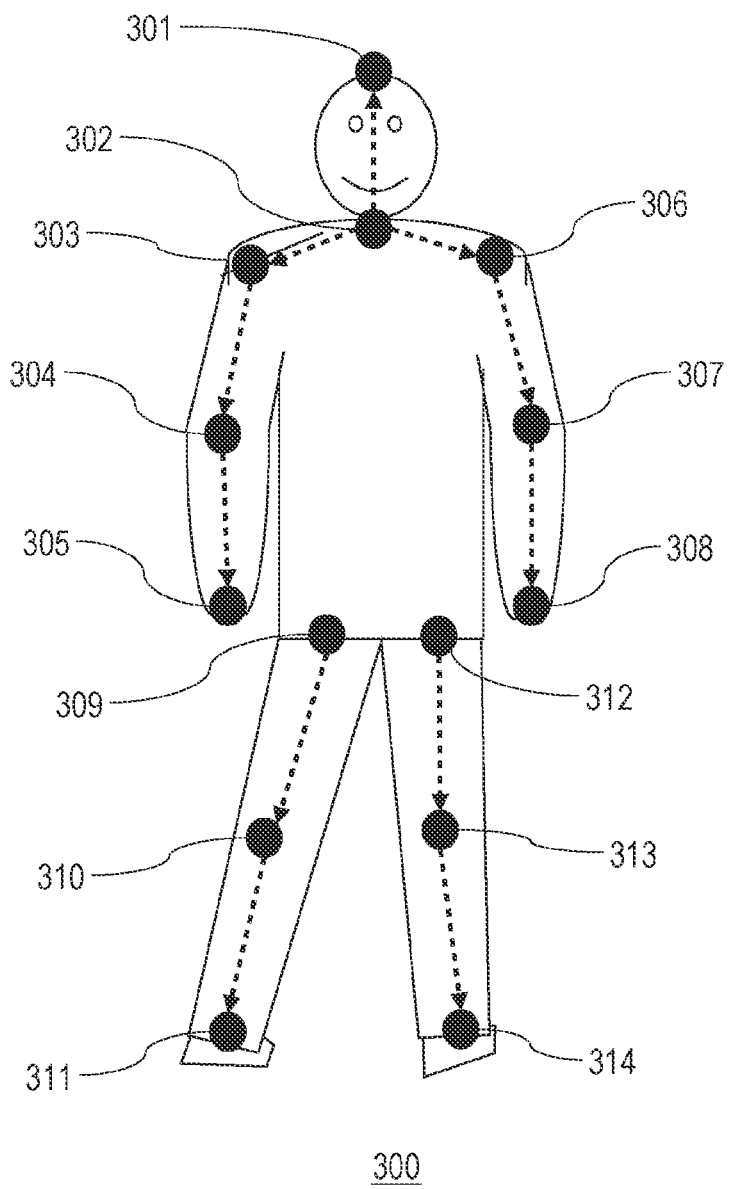
FIG. 3 is a diagram for explaining the positions of joint points to be detected by a part detecting unit.

In FIG. 3, a connection between joints is indicated by an arrow from a parent joint point to a child joint point. Specifically, the following 11 pairs each represent this connection: the neck point 302 and the head top point 301, the neck point 302 and the right shoulder point 303, the right shoulder point 303 and the right elbow point 304, the right elbow point 304 and the right wrist point 305, the neck point 302 and the left shoulder point 306, the left shoulder point 306 and the left elbow point 307, the left elbow point 307 and the left wrist point 308, the right hip joint point 309 and the right knee point 310, the right knee point 310 and the right ankle point 311, the left hip joint point 312 and the left knee point 313, and the left knee point 313 and the left ankle point 314. Note that the former in each pair is a parent joint point.

The part detecting unit 202 detects joint points by using a known technique, such as a technique using a deep neural network described in Non Patent Literature 1. Not all joint points are necessarily detected from one subject (person). Joints that do not appear in the image are given such information as "missing". Note that a subject with joint points that are all "missing" is not included in the result of detection.

N persons detected by the part detecting unit 202 in step S502 are denoted by $P_1, P_2, \ldots,$ and $P_N$. Joint points of a person Pi arranged in numerical order, from the head top point 301 to the left ankle point 314 in FIG. 3, are denoted by $J_{i1}, J_{i2}, \ldots,$ and $J_{iM}$, where M=14.

In the present embodiment, the part detecting unit 202 performs both detection of subjects in the image and detection of joints (which are parts of the subjects). The detection of subjects using, for example, an object recognition technique, may be followed by the detection of parts of each subject. Although joint points are detected as body parts in the present embodiment, parts to be detected are not limited to this. For example, the part detecting unit 202 may detect finger joints of both hands, or may detect organs, such as eyes, nose, and mouth. Instead of detecting joints (points), the part detecting unit 202 may detect palms, soles, trunk, head, and hips each as a plane, or may detect upper arms, lower arms, thighs, and shins as rod-like portions. A person's clothes, accessories, and personal belongings (e.g., a logo on uniform, a brim of a hat, and the tip of a white cane) may be regarded and detected as body parts.

Next, in step S503, the feature quantity calculating unit 203 calculates the feature quantity for each of the persons $P_1, P_2, \ldots,$ and $P_N$ with the method described above. In the present embodiment, the feature quantity calculating unit 203 calculates the feature quantity of the person 300 in the following way. First, the position of the center of gravity is calculated from the coordinates of all detected joint points in the image, and the relative coordinates from the center of gravity are determined for all the detected joints. Then, in order from the head top point 301 to the left ankle point 314, the x and y values are alternately arranged to form a 28-dimensional real-valued vector, which is used as the feature quantity of the person 300. Note that the x and y values of a "missing" joint point are both zero.

The form of and the method of calculating the feature quantity are merely an example, and the method of calculating the feature quantity is not limited to this. For example, the feature quantity may be calculated by using the distances between parts, the slopes of line segments connecting parts, the areas of parts, or detection scores from the part detecting unit 202, or may be calculated by normalization. Although a feature quantity calculated using a result of estimation of parts has been described as an example, intermediate layers of a deep neural network obtained in estimation of parts using the deep neural network may be used as the feature quantity. A value calculated by normalizing the intermediate layers based on, for example, the maximum value may be used as the feature quantity.

Next, in step S504, the subject state estimating unit 204 estimates the state of each subject. The state of the subject estimated in the present embodiment is indicated by one of the following six flags: Cutoff at Screen Bottom, Cutoff on Screen Left, Cutoff on Screen Right, Cutoff at Screen Top, Shielded by Other Person, and Self-Shielded. One of these flags is assigned as an independent flag to each subject. The method of estimating the state is described in detail later on below with reference to FIG. 6.

Next, in step S505, the classifying unit 205 classifies the feature quantity of each subject in accordance with the state of the subject estimated in step S504. In the present embodiment, the feature quantity is classified into one of a plurality of categories with different criteria for recognizing the characteristic of the subject. First, a subject with any of the following flags, Cutoff at Screen Bottom, Cutoff on Screen Left, Cutoff on Screen Right, and Cutoff at Screen Top, is classified into the category "excluded". Of subjects not classified into the category "excluded", a subject assigned the flag Shielded by Other Person is classified into the category "low priority", and a subject assigned only the flag Self-Shielded is classified into the category "high priority". A subject assigned none of the flags is classified into the category "normal".

Next, in step S506, the recognizing unit 206 recognizes a characteristic for the feature quantity of each subject. Here, the recognizing unit 206 recognizes whether the subject behaves abnormally. In the present embodiment, except in the case of some category (e.g., the category "excluded" here), recognizing an abnormal behavior involves using a known technique, such as that described in Non Patent Literature 2, in which the degree of deviation from a normal behavior is determined using locality-sensitive hashing (LSH). The LSH determines a score based on a hash distance. If the score exceeds a threshold T, the behavior is determined to be abnormal, and otherwise determined to be normal. The way of recognition is changed in accordance with the category determined in step S505. Another technique, such as Bayesian determination or a neural network, may be used to recognize the abnormal behavior.

First, the subject classified into "excluded" is unconditionally determined to be normal. This is because if the subject is cut off and the feature quantity lacks the corresponding information, the result tends to be unstable and to cause a false alarm. For other categories, the determination is made using LSH. Although the threshold T is used for the category "normal", a threshold T1 greater than T and a threshold T2 smaller than T are used for "low priority" and "high priority", respectively, in the determination. The thresholds T, T1, and T2 are appropriately defined in advance in learning of LSH.

In the case of Shielded by Other Person, the result also tends to be unstable and to cause a false alarm, as in the case where the subject is cut off. Even if the subject actually behaves abnormally, since another person is present nearby, the subject is likely to be rescued immediately. Therefore, if the flag Shielded by Other Person is set, the subject is classified into "low priority" to slow the issuing of an alarm. In the case of Self-Shielded, on the other hand, it is highly likely that the subject actually takes an abnormal pose. Therefore, if the flag Self-Shielded alone is set, the subject is classified into "high priority" to facilitate issuing of an alarm.

Next, in step S507, the terminal device 104 acquires video data, along with the result of analysis made by the analysis server 102 (i.e., the result of recognition performed by the recognizing unit 206). The display unit 208 then performs a display operation in accordance with the result of recognition in step S506. If abnormal behavior of at least one subject is recognized, the display unit 208 displays an alarm message in the image to call user's attention. Otherwise, no particular alarm message is to be displayed. This processing does not obstruct the display of a normal subject. For example, a detected person may be highlighted with a bounding rectangle, or parts of the person may be displayed. The category determined in step S505 may be displayed next to the person.

As described above, processing is performed appropriately in accordance with the state of parts of the subject. This reduces the occurrence of a false alarm and enables highly accurate recognition of the characteristic of the subject.

Next, the method of estimating the state of each subject in step S504 will be described in detail. As described above, the flags Cutoff at Screen Bottom, Cutoff on Screen Left, Cutoff on Screen Right, Cutoff at Screen Top, and Shielded by Other Person, are each determined in accordance with an independent flow. The determinations may be made in any order, or may be processed in parallel. The determinations according to these flows are performed once for each subject.

Figure 6A:
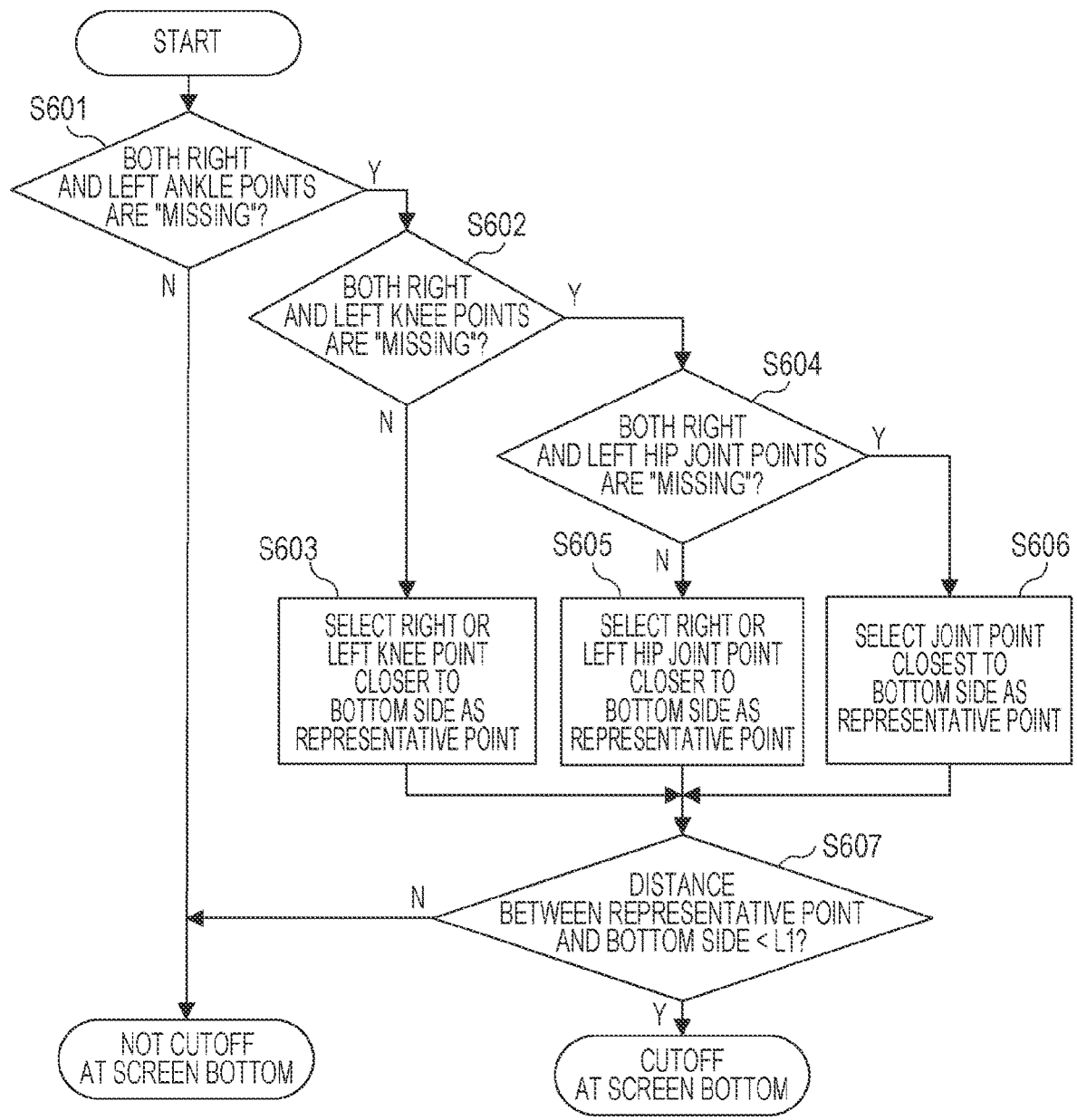
FIG. 6A is a flowchart illustrating an exemplary processing procedure for determining either whether the subject is cut off the screen or whether the subject is shielded by other person.

FIG. 6A is a flowchart illustrating an exemplary processing procedure for determining, in step S504, whether the subject is Cutoff at Screen Bottom. The following description is given using the parts illustrated in FIG. 3 as an example.

First, in step S601, the subject state estimating unit 204 determines whether the result of detection made by the part detecting unit 202 indicates that both the right ankle point 311 and the left ankle point 314 of the subject are "missing". If at least one of them is not "missing", the subject state estimating unit 204 determines that the subject is not Cutoff at Screen Bottom and terminates the processing without setting a flag. On the other hand, if both of them are "missing", the process proceeds to step S602.

Next, in step S602, the subject state estimating unit 204 determines whether the result of detection made by the part detecting unit 202 indicates that both the right knee point 310 and the left knee point 313 of the subject are "missing". If at least one of them is not "missing", the process proceeds to step S603. In step S603, the subject state estimating unit 204 selects a closer one of the right knee point 310 and the left knee point 313 to the bottom side of the screen as a representative point. If the result of detection made by the part detecting unit 202 indicates that one of them is "missing", the other is determined as a representative point. If the result of the determination made in step S602 indicates that both of them are "missing", the process proceeds to step S604.

In step S604, the subject state estimating unit 204 determines whether the result of detection made by the part detecting unit 202 indicates that both the right hip joint point 309 and the left hip joint point 312 of the subject are "missing". If at least one of them is not "missing", the process proceeds to step S605. In step S605, the subject state estimating unit 204 selects a closer one of the right hip joint point 309 and the left hip joint point 312 to the bottom side of the screen as a representative point. If the result of detection made by the part detecting unit 202 indicates that one of them is "missing", the other is determined as a representative point.

If the result of the determination made in step S604 indicates that both of them are "missing", the process proceeds to step S606. In step S606, the subject state estimating unit 204 selects a closest one of the non-"missing" joint points in the result of detection made by the part detecting unit 202 to the bottom side of the screen, as a representative point.

In step S607, the subject state estimating unit 204 determines a distance La between the representative point and the bottom side of the screen, and determines whether the distance La is below a predetermined threshold L1. If the distance La is below the threshold L1, the subject state estimating unit 204 determines that the subject is Cutoff at Screen Bottom, sets the flag, and terminates the processing. On the other hand, if the distance La is greater than or equal to the threshold L1, the subject state estimating unit 204 determines that the subject is not Cutoff at Screen Bottom and terminates the processing without setting a flag.

Figure 6B:
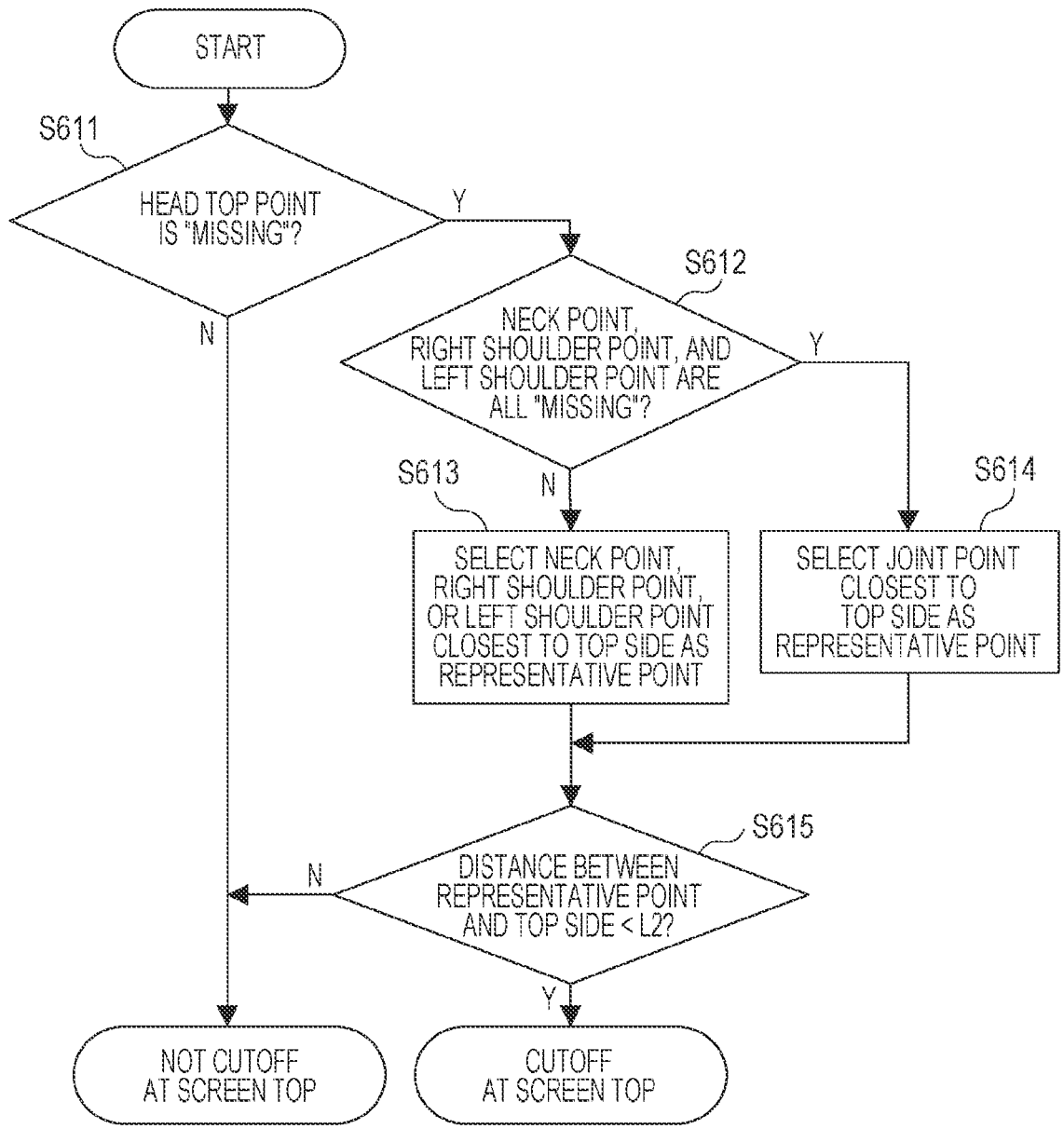
FIG. 6B is another flowchart illustrating the exemplary processing procedure for determining either whether the subject is cut off the screen or whether the subject is shielded by other person.

FIG. 6B is a flowchart illustrating an exemplary processing procedure for determining, in step S504, whether the subject is Cutoff at Screen Top.

In step S611, the subject state estimating unit 204 determines whether the result of detection made by the part detecting unit 202 indicates that the head top point 301 of the subject is "missing". If the head top point 301 of the subject is not "missing", the subject state estimating unit 204 determines that the subject is not Cutoff at Screen Top and terminates the processing without setting a flag. On the other hand, if the head top point 301 of the subject is "missing", the process proceeds to step S612.

In step S612, the subject state estimating unit 204 determines whether the result of detection made by the part detecting unit 202 indicates that the neck point 302, the right shoulder point 303, and the left shoulder point 306 of the subject are all "missing". If at least one of them is not "missing", the process proceeds to step S613. In step S613, the subject state estimating unit 204 selects a closest non-"missing" one of the neck point 302, the right shoulder point 303, and the left shoulder point 306 to the top side of the screen, as a representative point.

If the result of the determination made in step S612 indicates that the neck point 302, the right shoulder point 303, and the left shoulder point 306 are all "missing", the process proceeds to step S614. In step S614, the subject state estimating unit 204 selects a closest one of the non-"missing" joint points in the result of detection made by the part detecting unit 202 to the top side of the screen, as a representative point.

In step S615, the subject state estimating unit 204 determines a distance Lb between the representative point and the top side of the screen, and determines whether the distance Lb is below a predetermined threshold L2. If the distance Lb is below the threshold L2, the subject state estimating unit 204 determines that the subject is Cutoff at Screen Top, sets the flag, and terminates the processing. On the other hand, if the distance Lb is greater than or equal to the threshold L2, the subject state estimating unit 204 determines that the subject is not Cutoff at Screen Top and terminates the processing without setting a flag.

Figure 6C:
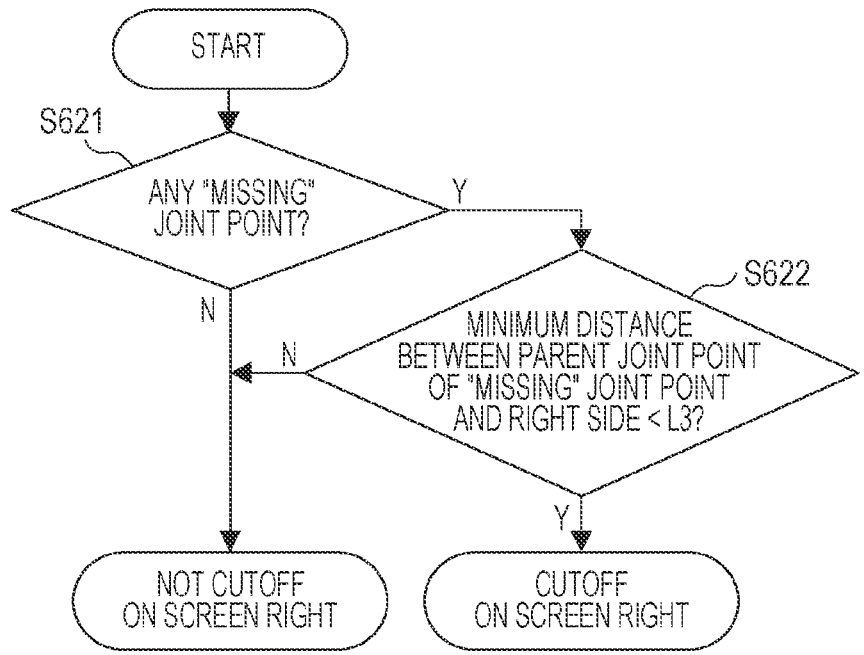
FIG. 6C is another flowchart illustrating the exemplary processing procedure for determining either whether the subject is cut off the screen or whether the subject is shielded by other person.

FIG. 6C is a flowchart illustrating an exemplary processing procedure for determining, in step S504, whether the subject is Cutoff on Screen Right.

First, in step S621, the subject state estimating unit 204 determines whether the result of detection made by the part detecting unit 202 includes any joint point determined to be "missing". If there is no joint point determined to be "missing", the subject state estimating unit 204 determines that the subject is not Cutoff on Screen Right and terminates the processing without setting a flag. On the other hand, if the subject state estimating unit 204 determines in step S621 that there is one or more joint points determined to be "missing", the process proceeds to step S622.

In step S622, the subject state estimating unit 204 determines the distance between the parent joint point of every joint point determined to be "missing" and the right side of the screen. The subject state estimating unit 204 then determines whether the minimum value of these distances (minimum distance Lc) is below a predetermined threshold L3. If the minimum distance Lc is below the threshold L3, the subject state estimating unit 204 determines that the subject is Cutoff on Screen Right, sets the flag, and terminates the processing. On the other hand, if the minimum distance Lc is greater than or equal to the threshold L3, the subject state estimating unit 204 determines that the subject is not Cutoff on Screen Right and terminates the processing without setting a flag.

Note that if a joint point determined to be "missing" does not have a parent joint point, or its parent joint point is also determined to be "missing", the subject state estimating unit 204 cannot calculate the distance to the right side of the screen. In this case, the subject state estimating unit 204 determines the minimum distance Lc in the absence of this joint point. If the minimum distance Lc cannot be determined due to the absence of all joint points, the subject state estimating unit 204 determines that the subject is not Cutoff on Screen Right.

The processing for determining whether the subject is Cutoff on Screen Left is performed in the same manner as the processing procedure illustrated in FIG. 6C. That is, the subject state estimating unit 204 determines the distance between each parent joint point and the left side of the screen, and determines whether the minimum value of these distances is below a threshold. The subject state estimating unit 204 thus determines, in the same manner as above, whether the subject is Cutoff on Screen Left.

Figure 6D:
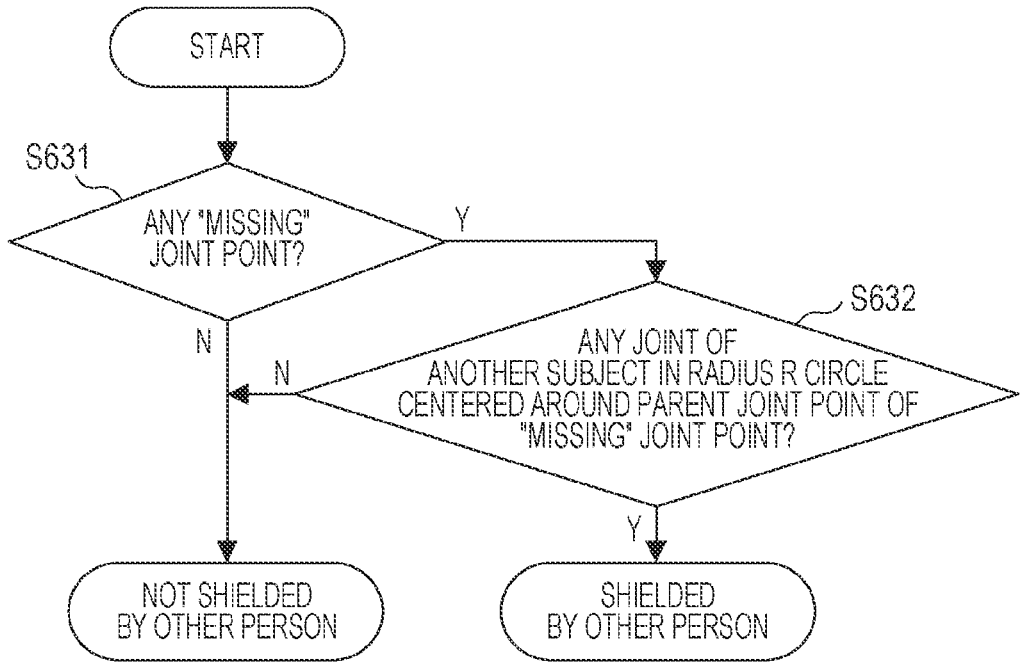
FIG. 6D is another flowchart illustrating the exemplary processing procedure for determining either whether the subject is cut off the screen or whether the subject is shielded by other person.

FIG. 6D is a flowchart illustrating an exemplary processing procedure for determining, in step S504, whether the subject is Shielded by Other Person.

First, in step S631, the subject state estimating unit 204 determines whether the result of detection made by the part detecting unit 202 includes any joint point determined to be "missing". If there is no joint point determined to be "missing", the subject state estimating unit 204 determines that the subject is not Shielded by Other Person and terminates the processing without setting a flag. On the other hand, if the subject state estimating unit 204 determines in step S631 that there is one or more joint points determined to be "missing", the process proceeds to step S632.

In step S632, the subject state estimating unit 204 focuses on the parent joint point of each joint point determined to be "missing". The subject state estimating unit 204 then determines whether any circle with a radius R centered around the parent joint point contains any joint point of another subject. If at least one joint point of another subject is contained, the subject state estimating unit 204 determines that the subject is Shielded by Other Person, sets the flag, and terminates the processing. On the other hand, if none of the circles contains any joint point of another subject, the subject state estimating unit 204 determines that the subject is not Shielded by Other Person and terminates the processing without setting a flag.

Note that if a joint point determined to be "missing" does not have a parent joint point, or its parent joint point is also determined to be "missing", a circle with the radius R cannot be drawn. In this case, the subject state estimating unit 204 determines, in the absence of this joint point, whether any circle contains a joint point of another subject. If no circle with the radius R can be drawn due to the absence of all joint points, the subject state estimating unit 204 determines that the subject is not Shielded by Other Person.

After completing the determination processing for Cutoff at Screen Bottom, Cutoff on Screen Left, Cutoff on Screen Right, Cutoff at Screen Top, and Shielded by Other Person as described above, the subject state estimating unit 204 performs processing for determining whether the subject is Self-Shielded. When none of the flags is set in the determination processing described above, if the result of detection made by the part detecting unit 202 includes a joint point determined to be "missing", the subject state estimating unit 204 determines that the subject is Self-Shielded and sets the flag.

As described above, the present embodiment estimates the state of a subject in terms of whether the subject is Cutoff at Screen Bottom, Cutoff on Screen Left, Cutoff on Screen Right, Cutoff at Screen Top, Shielded by Other Person, or Self-Shielded, and classifies the feature quantity of the subject in accordance with the state of the subject. It is thus possible to properly recognize the situation where, for example, an alarm should be issued.

The present embodiment has described a method that not only determines the feature quantity of a subject estimated from the positions of joint points, but also determines the state of the subject determined from the position of the subject on the screen or from whether the subject is shielded, and then classifies the feature quantity of the subject accordingly. The state of the subject may be integrated into the feature quantity estimated from the positions of joint points to determine an integrated feature quantity, which is then classified. As described above, the feature quantity may be obtained from intermediate layers of a deep neural network. If it is difficult to make a determination only from the feature quantity estimated from the positions of joint points, any feature quantity representing the state of the subject useful in classification, such as movement of the subject, may be used. The feature quantity is not limited to that described above.

Second Embodiment

The first embodiment has described a method in which the state of a subject is estimated using information about parts of the subject obtained from a single frame image. However, there are situations where the state of the subject cannot be easily identified using a single frame image alone, and the chance of overlooking abnormal behaviors may be increased. For the state of a subject that cannot be estimated using only the positions of parts, it is desirable to acquire the positions of parts in combination with other information. A second embodiment will describe a method of estimating the state of a subject using chronological video information, object recognition, and terrain information. Note that the present embodiment will only describe differences from the first embodiment, and description common to both embodiments will be omitted.

FIG. 7 is a diagram for explaining details of the state of a subject displayed in the display unit 208. FIG. 7(*a*) to FIG. 7(*c*) show exemplary images of a person walking from the bottom of the screen toward the back of the screen, and FIG. 7(*d*) to FIG. 7(*f*) show images of a person sitting down on the front side of the screen. A person 701 in FIG. 7(*a*), a person 702 in FIG. 7(*b*), and a person 703 in FIG. 7(*c*) are the same person, who is walking from the bottom of the screen toward the back of the screen. A person 704 in FIG. 7(*d*), a person 705 in FIG. 7(*e*), and a person 706 in FIG. 7(*f*) are the same person, who sits down.

The positions of joint points in the two examples described above may be similar, because of similarity in positional relation therebetween. For example, a comparison of joint points between the person 702 in FIG. 7(*b*) and the person 705 in FIG. 7(*e*) shows that the joint points of their feet and knees are both undetected, and positional differences between them may fall within the range of blur. When only feature quantities using joint points are used in classification, it is difficult to identify the differences between the two.

Also, as illustrated in FIG. 7(*g*) and FIG. 7(*h*), the feet and knees may be hidden by hand baggage 707 or stairs 708. The detected joint points and their positional relation in these cases may be similar to those in the cases of the person 702 in FIG. 7(*b*) and the person 705 in FIG. 7(*e*). When the feature quantity normalized by the size in the image is used, it is difficult to identify these differences.

In the present embodiment, additional information is used to accurately identify and classify the state of a person even in the situations where it cannot be easily identified. For example, by using chronological information from the preceding and succeeding frame images, the person in the example of FIG. 7(a) to FIG. 7(c) can be recognized as being in motion, and the person in the example of FIG. 7(d) to FIG. 7(f) can be recognized as sitting motionless. Also, by detecting an object using object recognition, a person sitting motionless can be recognized in the example of FIG. 7(d) to FIG. 7(f), and a person shielded by hand baggage or the surrounding terrain is identified as in the example of FIG. 7(g) or FIG. 7(h).

FIG. 8 is a block diagram illustrating an exemplary functional configuration of an information processing system according to the present embodiment. Unlike in the functional configuration illustrated in FIG. 2, the subject state estimating unit 204 includes an object recognizing unit 802 and a terrain acquiring unit 803, and the classifying unit 205 includes a tracking unit 801. Although the tracking unit 801, the object recognizing unit 802, and the terrain acquiring unit 803 each are included in the subject state estimating unit 204 or in the classifying unit 205, the configuration does not necessarily need to be that described above. For example, the camera 101 or a new server machine may have additional functional blocks thereon for communication of results.

The tracking unit 801 is constituted, for example, by an MPU. Based on video data received from the image capturing unit 201 and part information detected by the part detecting unit 202, the tracking unit 801 tracks a subject using a known technique, such as template matching.

The object recognizing unit 802 is constituted, for example, by an MPU. From video data received from the image capturing unit 201, the object recognizing unit 802 recognizes various objects using a general object recognition technique, such as that described in Non Patent Literature 3. The terrain acquiring unit 803 is constituted, for example, by an MPU. The object recognizing unit 802 acquires terrain information of a place where the image capturing unit 201 is capturing images. Examples of the terrain information described here include the positions of walls and stairs, the positions of fixed objects such as utility poles and signboards, and the position of the camera including the image capturing unit 201. The terrain information represents the positional relation in the place where images are captured. The terrain information, which is prepared in advance, may be stored in the analysis server 102 in advance, generated as three-dimensional information from a design drawing for a building, or generated by detecting pillars or stairs from video data.

A basic flow of processing of the present embodiment is the same as that illustrated in FIG. 5. In the present embodiment, the subject state estimating unit 204 assigns, to each subject, one of independent flags that include two additional flags, Shielded by Moving Object and Shielded by Fixed Object, as well as the six flags described in the first embodiment. The way of classification performed by the classifying unit 205 also differs from that in the first embodiment. First, a method of detecting the state of a subject according to the present embodiment will be described with reference to FIG. 9.

Figure 9A:
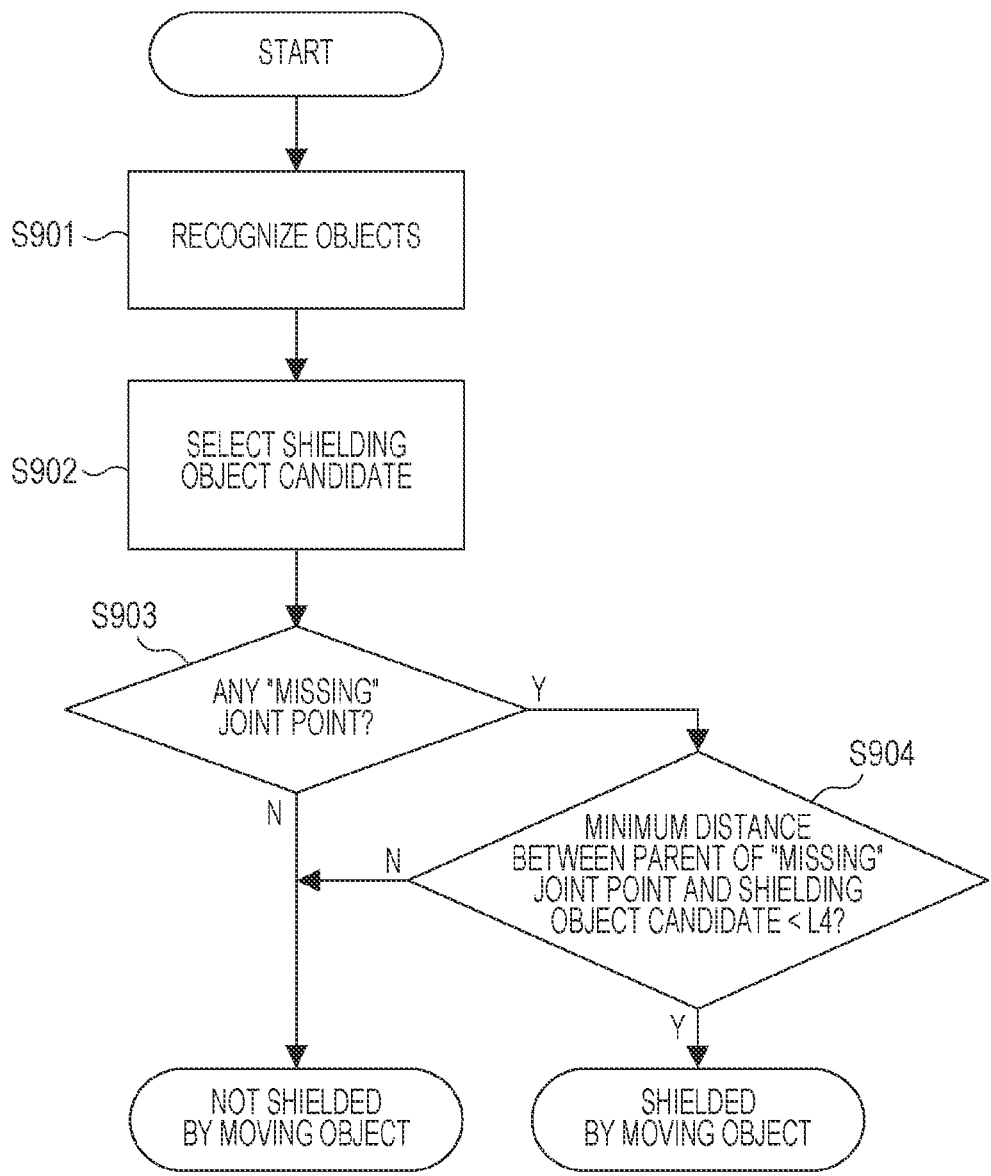
FIG. 9A is a flowchart illustrating an exemplary processing procedure for determining either whether the subject is shielded by moving object or whether the subject is shielded by fixed object according to the second embodiment.

FIG. 9A is a flowchart illustrating an exemplary processing procedure for determining, in step S504, whether the subject is Shielded by Moving Object.

First, in step S901, the object recognizing unit 802 recognizes objects from video data received from the image capturing unit 201. The object recognizing unit 802 calculates as many pairs of a rectangle in the image and the class of an object, as the number of recognized objects.

Next, in step S902, from the objects recognized in step S901, the subject state estimating unit 204 selects an object likely to shield a person as a shielding object candidate. In the processing described here, objects included in a class of backgrounds, such as sky, mountains, and clouds, and objects included in a subclass of persons, such as males and children, are excluded from options. A person is not selected as a shielding object candidate here, because it is used in processing for determining whether the subject is Shielded by Other Person. An object included in a class of possible personal belongings, such as bags, boxes, and balls, is selected as a shielding object candidate. The subject state estimating unit 204 may select more than one shielding object candidate, or may select no shielding object candidate. The class of an object to be selected is determined in advance. The object recognizing unit 802 may be configured to recognize only objects included in a predetermined class.

Next, in step S903, the subject state estimating unit 204 determines whether the result of detection made by the part detecting unit 202 includes any joint point determined to be "missing". If there is no joint point determined to be "missing", the subject state estimating unit 204 determines that the subject is not Shielded by Moving Object and terminates the processing without setting a flag. On the other hand, if the subject state estimating unit 204 determines in step S903 that there is one or more joint points determined to be "missing", the process proceeds to step S904.

In step S904, the subject state estimating unit 204 determines the distance between the parent joint point of every joint point determined to be "missing" and the shielding object candidate selected in step S902. The subject state estimating unit 204 then determines whether the minimum value of these distances (minimum distance Ld) is below a predetermined threshold L4. If the minimum distance Ld is below the threshold L4, the subject state estimating unit 204 determines that the subject is Shielded by Moving Object, sets the flag, and terminates the processing. On the other hand, if the minimum distance Ld is greater than or equal to the threshold L4, the subject state estimating unit 204 determines that the subject is not Shielded by Moving Object and terminates the processing without setting a flag. Note that if no shielding object candidate has been selected, the subject state estimating unit 204 determines that the subject is not Shielded by Moving Object.

Figure 9B:
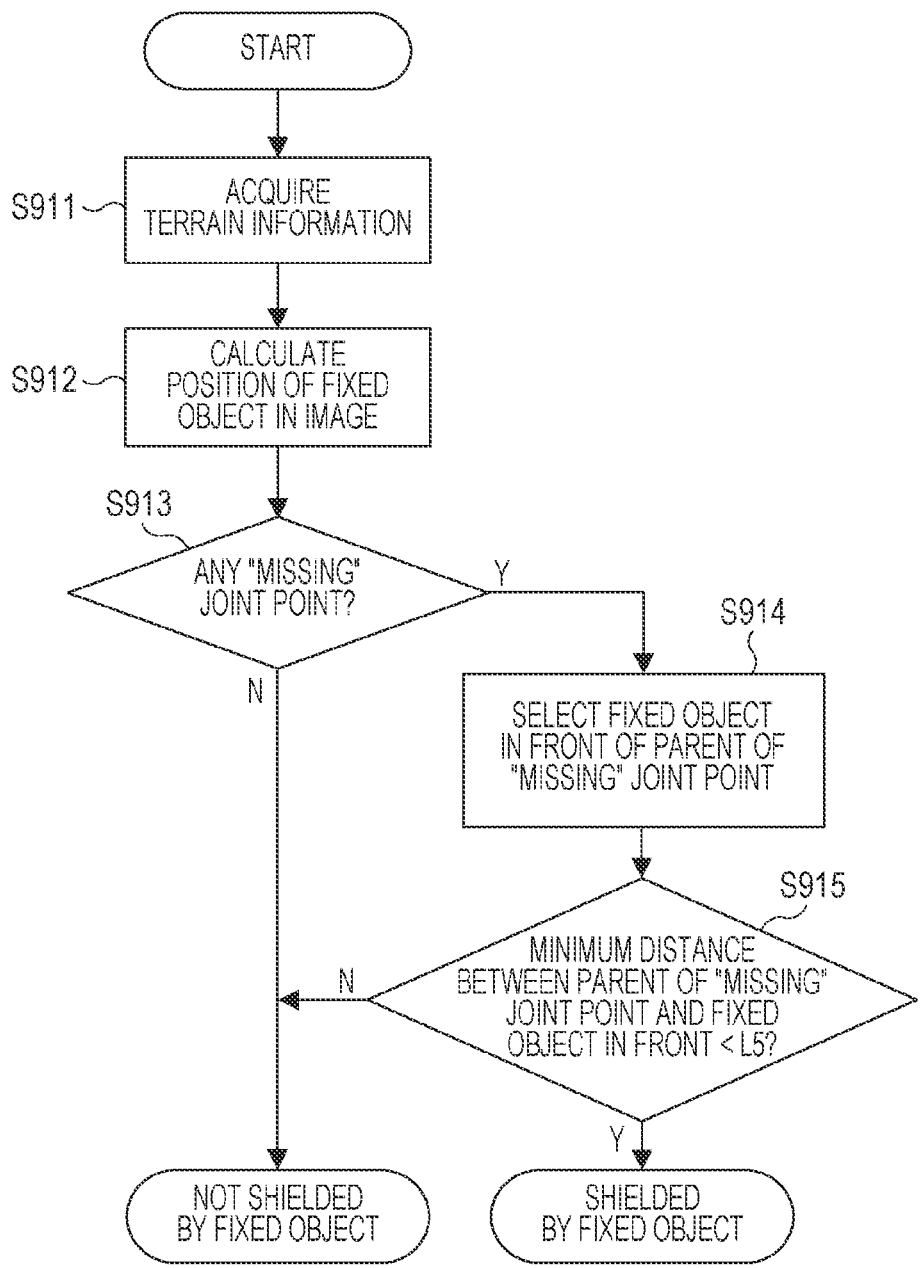
FIG. 9B is another flowchart illustrating the exemplary processing procedure for determining either whether the subject is shielded by moving object or whether the subject is shielded by fixed object according to the second embodiment.

FIG. 9B is a flowchart illustrating an exemplary processing procedure for determining, in step S504, whether the subject is Shielded by Fixed Object.

First, in step S911, the terrain acquiring unit 803 acquires terrain information about a place where the image capturing unit 201 is capturing images.

Next, in step S912, based on the terrain information acquired in step S911, the subject state estimating unit 204 calculates a fixed object contained in the image captured by the image capturing unit 201 as a polygonal region present in the image.

Next, in step S913, the subject state estimating unit 204 determines whether the result of detection made by the part detecting unit 202 includes any joint point determined to be "missing". If there is no joint point determined to be "missing", the subject state estimating unit 204 determines that the subject is not Shielded by Fixed Object and terminates the processing without setting a flag. On the other hand, if the subject state estimating unit 204 determines in step S913 that there is one or more joint points determined to be "missing", the process proceeds to step S914.

In step S914, the subject state estimating unit 204 focuses on the parent joint point of each joint point determined to be "missing", and then selects a fixed object estimated to be present in front of the parent joint point. Specifically, first, the subject state estimating unit 204 searches for a fixed object F overlapping the parent joint point. If overlapping the parent joint point, the fixed object F is likely to be present behind the parent joint point. Therefore, based on the terrain information, the subject state estimating unit 204 selects a fixed object present in front of the fixed object F as an object likely to be present in front of the parent joint point. If there is no fixed object F overlapping the parent joint point, the subject state estimating unit 204 selects all fixed objects. The subject state estimating unit 204 may determine the front and back relation of the parent joint point and the fixed object by using a range image camera or estimating a three-dimensional position.

In step S915, the subject state estimating unit 204 determines the distance between the parent joint point of each joint point determined to be "missing" and the fixed object selected in step S914. The subject state estimating unit 204 then determines whether the minimum value of these distances (minimum distance Le) is below a predetermined threshold L5. If the minimum distance Le is below the threshold L5, the subject state estimating unit 204 determines that the subject is Shielded by Fixed Object, sets the flag, and terminates the processing. On the other hand, if the minimum distance Le is greater than or equal to the threshold L5, the subject state estimating unit 204 determines that the subject is not Shielded by Fixed Object and terminates the processing without setting a flag. Note that if there is no fixed object to be selected in step S914, the subject state estimating unit 204 determines that the subject is not Shielded by Fixed Object.

In the present embodiment, as described above, the processing is performed in step S504 to determine whether the subject is Cutoff at Screen Bottom, Cutoff on Screen Left, Cutoff on Screen Right, Cutoff at Screen Top, Shielded by Other Person, Shielded by Moving Object, and Shielded by Fixed Object. After completion of the processing, the subject state estimating unit 204 performs processing to determine whether the subject is Self-Shielded. If no flag is set in the determination processing described above and the result of detection made by the part detecting unit 202 includes a joint point determined to be "missing", the subject state estimating unit 204 determines that the subject is Self-Shielded and sets the flag.

Figure 10:
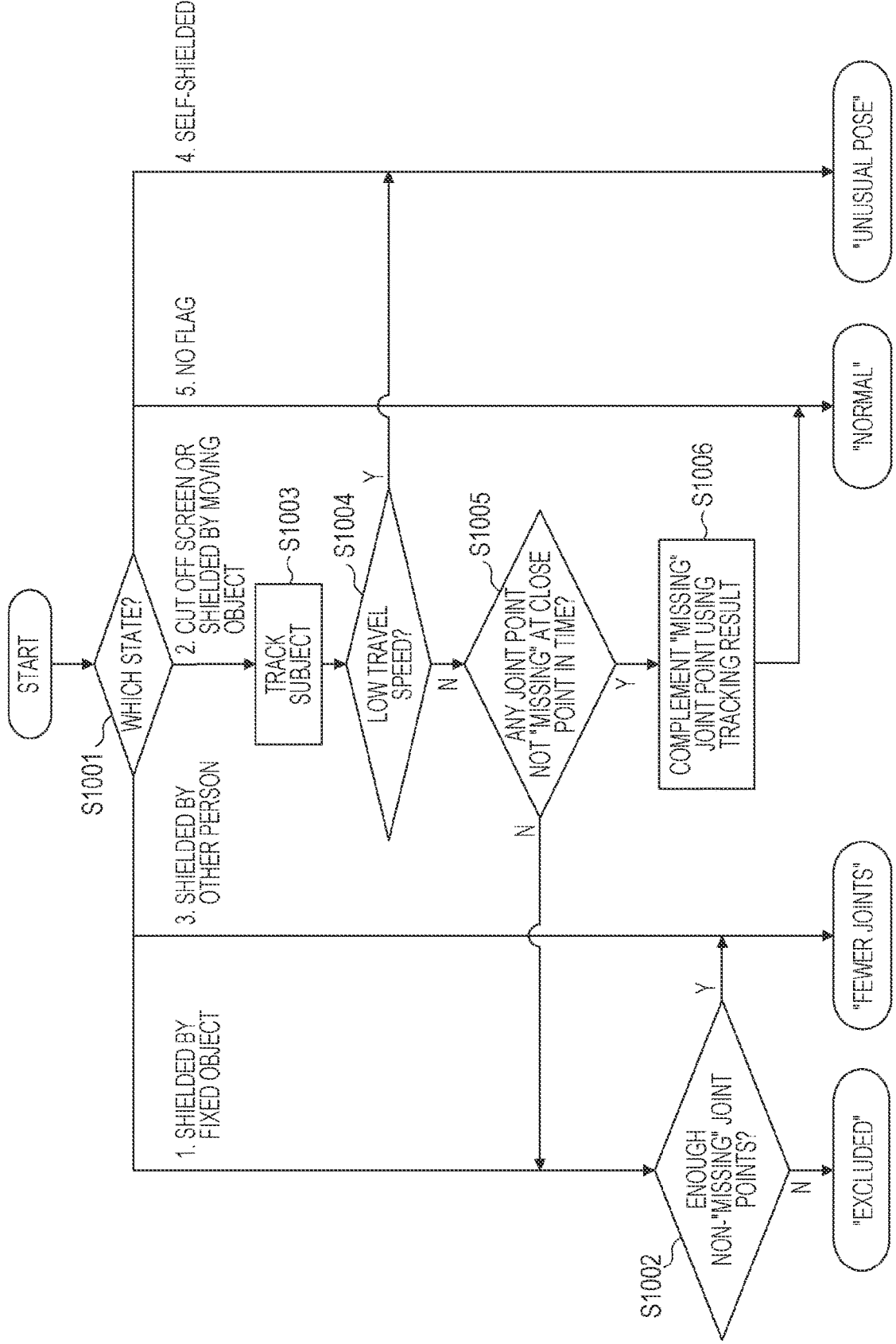
FIG. 10 is a flowchart illustrating an exemplary processing procedure for classifying a feature quantity of a subject according to the second embodiment.

With reference to FIG. 10, a method will now be described as to how the classifying unit 205 classifies the feature quantity of each subject in step S505 according to the present embodiment. In the present embodiment, the classifying unit 205 classifies the feature quantity of each subject into one of the four categories: "excluded", "normal", "fewer joints", and "unusual pose".

FIG. 10 is a flowchart illustrating an exemplary processing procedure performed by the classifying unit 205 in step S505 to classify the feature quantity of a subject in the present embodiment.

In step S1001, the classifying unit 205 causes the processing to branch in accordance with the flag representing the state of the subject estimated in step S504. First, if the flag Shielded by Fixed Object is set, the classifying unit 205 selects branch number 1 and goes to step S1002. When the subject is not in the state of branch number 1, if either the flag indicating that the subject is cut off (Cutoff at Screen Bottom, Cutoff on Screen Left, Cutoff on Screen Right, or Cutoff at Screen Top) or the flag Shielded by Moving Object is set, the classifying unit 205 selects branch number 2 and goes to step S1003. If the subject is neither in the state of branch number 1 nor 2 and the flag Shielded by Other Person is set, the classifying unit 205 selects branch number 3, classifies the feature quantity of the subject into "fewer joints", and terminates the processing. If the subject is in the state of none of branch numbers 1 to 3 and the flag Self-Shielded is set, the classifying unit 205 selects branch number 4, classifies the feature quantity of the subject into "unusual pose", and terminates the processing. If none of the flags is set and the subject is in the state of none of branch numbers 1 to 4, the classifying unit 205 selects branch number 5, classifies the feature quantity of the subject into "normal", and terminates the processing.

In step S1002, the classifying unit 205 determines whether conditions that allow the recognizing unit 206 to fully recognize the characteristic of the target in step S506 are satisfied. In the present embodiment, the conditions are determined to be satisfied if the part detecting unit 202 does not determine that at least one of the head top point 301 and the neck point 302 is "missing" and the number of joint points determined to be "missing" does not exceed four. If the conditions described above are determined to be satisfied, the classifying unit 205 classifies the feature quantity of the subject into "fewer joints" and terminates the processing. On the other hand, if the conditions described above are not satisfied, the classifying unit 205 classifies the feature quantity of the subject into "excluded" and terminates the processing.

Note that the conditions that allow full recognition of the characteristic of the target, described above, are merely examples. Other conditions may be used, or the conditions may be changed depending on the type of the characteristic to be recognized by the recognizing unit 206. For example, if the action of holding an object is to be recognized, the conditions may be that none of the four points, the right and left wrist points 305 and 308 and the right and left elbow points 304 and 307, is determined to be "missing". Also, for example, if the action of running is to be recognized, the conditions may be that neither of the two points, the right and left ankle points 311 and 314, is determined to be "missing".

The operation in step S1003 is performed when the subject is cut off the screen or Shielded by Moving Object. Unlike in the case of Shielded by Fixed Object, the shielding may be cancelled by the movement of a person or shielding object. Therefore, the final classification is determined by using chronological information.

In step S1003, the tracking unit 801 tracks the current subject using an image at a time point close to the present and acquires a result at the time point. In this operation, the tracking unit 801 acquires, from the storage unit 207 of the recording server 103, video data captured for one second immediately before the present, and also acquires the result of detection of parts of a person estimated to be the same person as the current subject. Note that "one second immediately before the present" is merely an example, and video data captured for a different time duration may be used. Also, for example, by acquiring video data after waiting for 0.5 seconds, the tracking unit 801 may acquire information from future video data of the subject at the time point of interest.

In step S1004, the classifying unit 205 calculates the travel speed of the subject using the result of the tracking in step S1003, and determines whether the travel speed is low. In this operation, for each of joint points not determined to be "missing" during tracking, the classifying unit 205 calculates the travel speed on the screen. Then, based on whether the average speed is below a predetermined threshold V, the classifying unit 205 determines whether the travel speed is low. If the travel speed is determined to be low, the subject is considered to be at rest and may be in the state illustrated in FIG. 7(*d*) to FIG. 7(*f*). Accordingly, the classifying unit 205 classifies the feature quantity of the subject into "unusual pose", and terminates the processing. On the other hand, if the travel speed is not low, the process proceeds to step S1005.

In step S1005, the classifying unit 205 determines whether any of joint points determined to be "missing" in the current subject is not determined to be "missing" in the tracking result obtained in step S1003. If there is one or more joint points not determined to be "missing" in the tracking result, the process proceeds to step S1006, whereas if none of joint points is not determined to be "missing", the process proceeds to step S1002 described above.

In step S1006, from the tracking result, the classifying unit 205 estimates the position of the joint point determined to be "missing" in the current subject and not determined to be "missing" in the tracking result, and complements the estimated position. Specifically, the classifying unit 205 determines the travel speed of the joint point from the tracking result, and complements the position of the current joint point based on estimation that the joint point has moved to the current position at a constant speed. The classifying unit 205 then classifies the feature quantity of the subject into "normal" and terminates the processing.

Next, the operation in step S506 according to the present embodiment will be described. The recognizing unit 206 unconditionally determines the subject classified into "excluded" in step S505 to be normal, as in the first embodiment described above. On the other hand, for the subject classified into "normal", "fewer joints", or "unusual pose", the recognizing unit 206 determines the degree of deviation from a normal behavior using locality-sensitive hashing, as in the first embodiment, to determine whether the subject behaves abnormally. In the present embodiment, hashes are generated in advance based on different statistical models of normal behaviors, and a different statistical model is used for each classification.

For example, a statistical model used in the determination for a subject classified into "normal" is one that is generated by learning using an image showing a normal entire body. Also, a statistical model used in the determination for a subject classified into "fewer joints" is one that is generated by learning using an image generated by intentionally eliminating joints from normal walking. Also, a statistical model used in the determination for a subject classified into "unusual pose" is one that is generated by learning using an image of simulated behaviors other than walking. Then, the determination as to whether the subject behaves abnormally is made using a different statistical model depending on the classification.

As described above, by using chronological information and other results of recognition, the present embodiment can take an appropriate method of recognition in accordance with the state of the subject, and can improve the accuracy of recognition.

Third Embodiment

Although the first and second embodiments have described examples of using images from a single camera, more accurate recognition can be achieved by using a plurality of cameras. Accordingly, a third embodiment will describe a method of recognition using a plurality of cameras. Note that the present embodiment will describe differences from the second embodiment, and description common to both embodiments will be omitted.

A basic configuration of the present embodiment is the same as that illustrated in FIG. 8, except that a plurality of cameras 101 are provided in the present embodiment. The analysis server 102 receives input of a plurality of pieces of video data, performs the processing described in the second embodiment on each of the corresponding images, and detects an abnormal behavior. The recording server 103 stores images from the plurality of cameras and the results of processing performed by the analysis server. The terminal device 104 allows the user to view images from the plurality of cameras, and issues an alarm if any of the cameras detects an abnormal behavior.

Figure 11A:
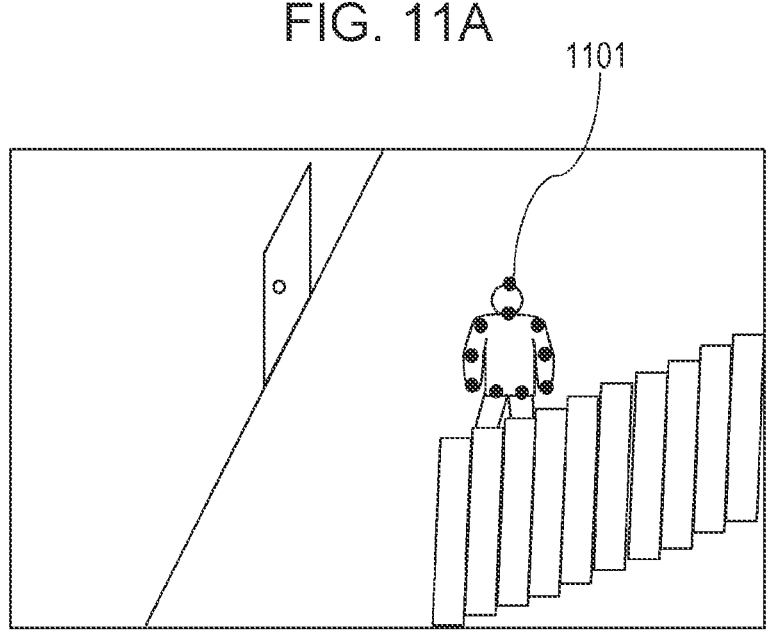
FIG. 11A is a diagram illustrating an exemplary image captured by one of a plurality of cameras.

FIG. 11A is a schematic diagram illustrating an exemplary image including a person 1101 whose feet and lower legs are shielded by stairs. The image shown in FIG. 11A is the same as that in FIG. 7(*h*). In the second embodiment, where recognition needs to be carried out using an image from only one camera, the subject is processed, for example, as "fewer joints".

Figure 11B:
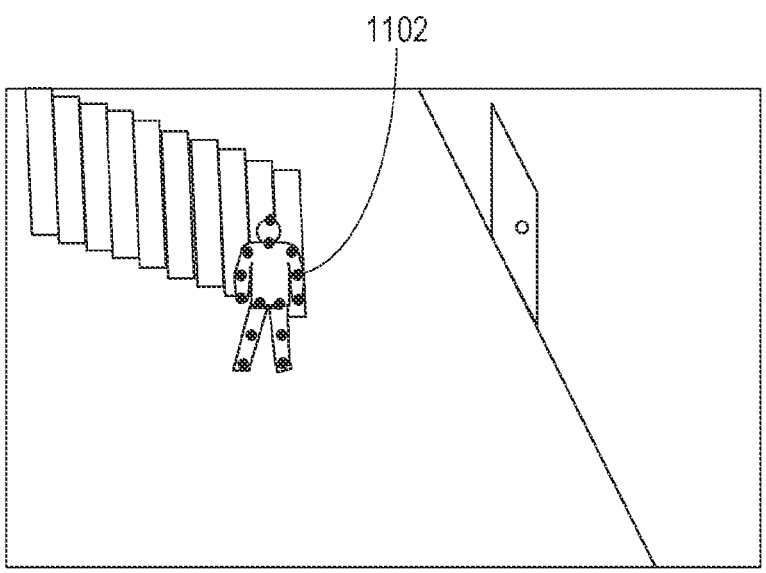
FIG. 11B is a diagram illustrating an exemplary image captured by another of the plurality of cameras.

When another camera is installed on the opposite side, an image such as that illustrated in FIG. 11B is obtained. With the image shown in FIG. 11B, all joint points of the same person 1102 can be detected. Accordingly, when an image such as that illustrated in FIG. 11B is available, processing from this image is given higher priority over the processing from the image illustrated in FIG. 11A, so that processing from a subject with fewer detected parts can be avoided.

A specific processing procedure will now be described. In the present embodiment, different degrees of priority are given to recognition results for accuracy in obtaining the recognition results. In step S506, the recognizing unit 206 assigns classification information to the recognition result for each of images from the plurality of cameras 101. After completion of recognition processing on all the camera images, the recognizing unit 206 detects whether the camera images contain the same subject. The detection of whether the subject is the same one can be made by tracking between multiple cameras using the tracking unit 801, or by determining from information about overlaps in the field of view of cameras and the subject's position in the image, based on information acquired by the terrain acquiring unit 803.

If images from the plurality of cameras 101 contain the same subject, a recognition result classified as "normal" for this subject is given priority over the other recognition results for this subject. For example, when a recognition result from an image classified as "normal" is normal, even if a recognition result from another camera is classified as "fewer joints" or "unusual pose" and determined to be abnormal behavior, the recognition result indicating abnormal behavior is considered less reliable and ignored.

In the present embodiment, as described above, different degrees of priority are given to recognition results, and a recognition result from an image classified as "normal" is given priority. This makes it possible to obtain a recognition result based on highly reliable information, and thus to achieve improved accuracy.

Fourth Embodiment

The first to third embodiments have described examples where a subject is a human and joints and other portions of a human body are used as parts of the subject. A fourth embodiment will describe an example where a subject is not a human. Specifically, an example will be described in which a subject is a car and car components are used as parts of the subject. Note that the present embodiment will describe differences from the first embodiment, and description common to both embodiments will be omitted.

Figure 12:
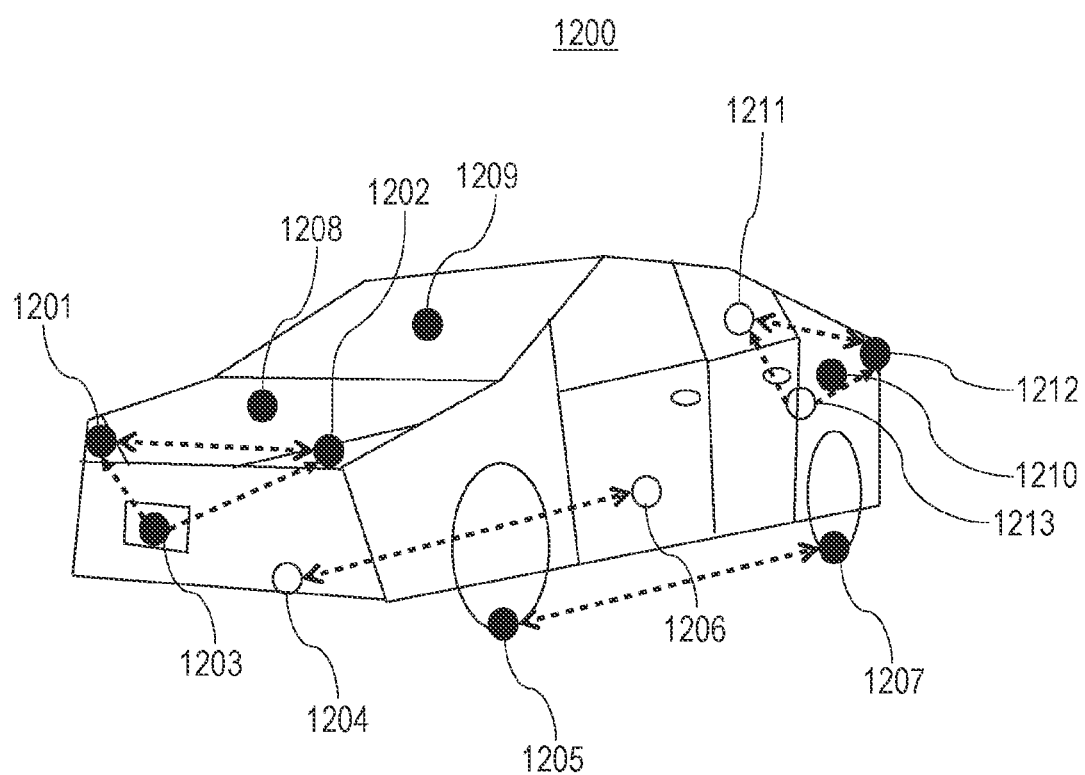
FIG. 12 is a diagram for explaining car parts to be detected by the part detecting unit.

FIG. 12 is a diagram for explaining car parts to be detected by the part detecting unit 202 in the present embodiment. The part detecting unit 202 detects a right headlight point 1201, a left headlight point 1202, a front license plate point 1203, a right front wheel point 1204, a left front wheel point 1205, a right rear wheel point 1206, and a left rear wheel point 1207 of a car 1200 as part points. The part detecting unit 202 also detects a hood center point 1208, a windshield center point 1209, a fuel filler point 1210, a right rear light point 1211, a left rear light point 1212, and a rear license plate point 1213 as part points. The part detecting unit 202 thus detects 13 parts described above. Note that the right front wheel point 1204, the left front wheel point 1205, the right rear wheel point 1206, and the left rear wheel point 1207 are ground points. Also, in the example illustrated in FIG. 12, the right front wheel point 1204, the right rear wheel point 1206, the right rear light point 1211, and the rear license plate point 1213 are Self-Shielded.

In each of the following pairs, the former serves as a parent part point and the latter serves as a child part point: the right headlight point 1201 and the left headlight point 1202, the right front wheel point 1204 and the right rear wheel point 1206, the left front wheel point 1205 and the left rear wheel point 1207, and the right rear light point 1211 and the left rear light point 1212. The parent-child relation may be reversed. Note that the front license plate point 1203 has both the right headlight point 1201 and the left headlight point 1202 as parent part points, and the rear license plate point 1213 has both the right rear light point 1211 and the left rear light point 1212 as parent part points.

If there is any "missing" part point, the relation between the "missing" part point and its parent part point is used in the processing performed by the subject state estimating unit 204. Therefore, it is desirable that components at both ends of each of the front, rear, right, and left sides have a parent-child part relation, or that a parent part point be designated for a critical part, such as a license plate. Note that the definition of the parts described above is merely an example, and different part points may be defined for a car of a different shape, such as a truck.

In the present embodiment, the joint points mentioned in the first to third embodiments are described as part points. Thus, other subjects, such as cars, can be classified in the same manner as above, and recognized with high accuracy. Although a car has been presented as an exemplary subject in the present embodiment, the technique described herein is also applicable to articles configured to hold parts and non-human creatures that can be identified from an image.

Other Embodiments

The present disclosure can also be implemented by processing in which a program performing at least one of the functions of the embodiments described above is supplied to a system or apparatus via a network or storage medium and at least one processor in a computer of the system or apparatus reads and executes the program. The present disclosure can also be implemented by a circuit (e.g., ASIC) that performs the at least one function.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. An image processing apparatus comprising: a memory storing instructions; and at least one processor configured to execute the instructions to; detect a plurality of predetermined parts of a subject from an image; estimate a cause of failed detection if any of the plurality of predetermined parts is not detected in a result of the detection made; determine a state of the subject based on a part detected and the cause estimated; extract a feature quantity of the subject based on the part detected; classify the feature quantity into one of a plurality of categories based on the state determined; and recognize a characteristic of the subject based on a result of the classification performed.

2. The image processing apparatus according to claim 1, the cause of the failed detection is estimated based on a position of the subject in the image.

3. The image processing apparatus according to claim 2, wherein the cause of the failed detection is estimated based on a distance between the position of the subject in the image and an end portion of the image.

4. The image processing apparatus according to claim 1, wherein the cause of the failed detection is estimated based on a position of the subject and a position of an object not being the subject.

5. The image processing apparatus according to claim 1, wherein the state of the subject is determined based on a position of the detected part and the estimated cause.

6. The image processing apparatus according to claim 5, wherein the position of the part is a position relative to a reference position of the subject.

7. The image processing apparatus according to claim 1, wherein whether the state of the subject is normal or abnormal is determined.

8. The image processing apparatus according to claim 1, wherein a pose of the subject is determined.

9. The image processing apparatus according to claim 8, wherein whether the pose of the subject is abnormal is determined.

10. The image processing apparatus according to claim 1, wherein the subject is a human, and the predetermined parts are joints or regions of the human.

11. The image processing apparatus according to claim 1, wherein a method of recognition is changed based on a result of the classification performed.

12. The image processing apparatus according to claim 11, wherein a feature quantity classified into some of the categories is excluded from a target of recognition.

13. The image processing apparatus according to claim 11, wherein the method of recognition is changed by changing a threshold used in the recognition.

14. The image processing apparatus according to claim 11, wherein the method of recognition is changed by changing a statistical model used in the recognition.

15. The image processing apparatus according to claim 1, wherein the feature quantity is classified for each of a plurality of images including the subject; and the characteristic of the subject is recognized based on a result of the classification performed for the plurality of images.

16. The image processing apparatus according to claim 1, wherein the feature quantity of the subject is classified using a plurality of chronological images.

17. The image processing apparatus according to claim 1, wherein the at least one processor is further configured to execute the instructions to track the subject using the plurality of chronological images, wherein the feature quantity of the subject is classified based on a result of the tracking.

18. An image processing method comprising:
- a detecting step of detecting a plurality of predetermined parts of a subject from an image;
- an estimating step of estimating a cause of failed detection if any of the plurality of predetermined parts is not detected in a result of the detection made in the detecting step;
- a determining step of determining a state of the subject based on a part detected in the detecting step and the estimated cause;
- extracting step of extracting a feature quantity of the subject based on the part detected by the detecting step;
- classifying step of classifying the feature quantity into one of a plurality of categories based on the state determined by the determining step; and
- characteristic recognizing step of recognizing a characteristic of the subject based on a result of the classification performed by the classifying step.

19. A non-transitory computer-readable medium storing a program causing a computer to execute an image processing method, the image processing method comprising: a detecting step of detecting a plurality of predetermined parts of a subject from an image; an estimating step of estimating a cause of failed detection if any of the plurality of predetermined parts is not detected in a result of the detection made in the detecting step; a determining step of determining a state of the subject based on a part detected in the detecting step and the estimated cause; an extracting step of extracting a feature quantity of the subject based on the part detected by the detecting step; a classifying step of classifying the feature quantity into one of a plurality of categories based on the state determined by the determining step; and a characteristic recognizing step of recognizing a characteristic of the subject based on a result of the classification performed by the classifying step.

* * * * *